MERRILL L. SWAN
INVENTOR.

BY Reed C. Lawlor
ATTORNEY

MERRILL L. SWAN
INVENTOR.

BY Reed C. Lawlor
ATTORNEY

MERRILL L. SWAN
INVENTOR.
BY Reed C. Lawlor
ATTORNEY

MERRILL L. SWAN
INVENTOR.
BY Reed C. Lawlor
ATTORNEY

MERRILL L. SWAN
INVENTOR.

BY Reed C. Lawlor

ATTORNEY

MERRILL L. SWAN
INVENTOR.
BY Reed C. Lawlor
ATTORNEY

MERRILL L. SWAN
INVENTOR.

BY Reed C. Lawlor
ATTORNEY

MERRILL L. SWAN
INVENTOR

BY [signature]
ATTORNEY

MERRILL L. SWAN
INVENTOR.
BY Reed C. Lawlor
ATTORNEY

United States Patent Office 3,449,553

Patented June 10, 1969

3,449,553

COMPUTER FOR DETERMINING THE CORRELATION FUNCTION OF VARIABLE SIGNALS

Merrill L. Swan, Arcadia, Calif., assignor to United Geophysical Corporation, Pasadena, Calif., a corporation of Delaware Filed Aug. 23, 1965, Ser. No. 481,524

Int. Cl. G06j *1/02;* G06g *7/16;* G06f *7/38*

U.S. Cl. 235—150.52 23 Claims

ABSTRACT OF THE DISCLOSURE

This invention facilitates the making of correlation functions between two series of digital signals that vary as functions of time. The signals to be correlated are continuously circulated in circulating digital memory units and precessing means is used with one or both of the circulating memories causing series of digital numbers to be variably displaced in time relative to each other in each circulation cycle. The signals from the two circulating memories are multiplied together in a manner in which the product of the multiplication varies as a function of time.

This invention relates to electronic digital computers, and, more particularly, to an improved digital correlation computer that is particularly versatile and can accept input signals in either analog or digital form and perform a cross-correlation operation on two series of signals.

In the past, various devices have been provided for correlating two electrical signals. However, most of these have been adapted for correlating analog signals and thus have had the inherent inaccuracy that is characteristic of analog devices. Such prior art correlation devices have generally incorporated magnetic drum or magnetic tape storage means to store the analog signals being correlated. Thus, they are limited in their operational speed by the speeds at which the magnetic storage drum can be rotated or the magnetic tape advanced past a reading head. Also, utilizing drum or tape storage introduces mechanically moving parts into the device with their attendant problems of mechanical breakdown.

A correlation computer constructed in accordance with the present invention obviates the disadvantages of the prior art and provides a strongly versatile, highly accurate, digital device. The input signals to the computer of the invention may be in either analog or digital form and the digital signals may be inserted either manually from a keyboard or automatically from previously prepared magnetic or punched paper tape or other record media, or from the memory storage device of a digital computer. Of course, it incorporates the high accuracy inherent in a digital device. Circulating memories are utilized to store the two signals being correlated, and no moving parts are utilized in the computer of the invention. The components utilized are of standard design and the computer logic employed is relatively simple. In addition, because there is no need for drum or tape storage devices, the computer of the invention is small in size and of relatively light weight.

As previously mentioned, the digital correlation computer embodying the invention can accept input data in either analog or digital signal form. If the input signal is in analog form it is converted to digital form by an analog-to-digital converter. If the input signals are in digital form, from either manual or stored input means, they are, of course, used in that form, Two circulating digital memories are provided for respectively storing two series of digital numbers to be correlated. Precessing means are provided, which are selectively operable with one or both of the circulating memories for causing the series of numbers stored therein to be variably displaced in time with each circulation cycle.

Multiplying means are connected to the outputs of the circulating memories for multiplying together successive digital numbers respectively stored in the two circulating memories and providing analog output, signals whose amplitudes are proportional to the products of the two numbers being multiplied. A particular feature of the invention is that the analog output signals from the multiplying means have one polarity when the algebraic signs of two numbers being multiplied together are the same and as opposite polarity when the algebraic signs of the two numbers are different.

A third circulating memory may also be provided, which acts as an auxiliary memory. It may be utilized to store the same signals that are stored in one of the other circulating memories so that they may be displayed on an output device, such as an oscilloscope, or utilized to drive a recording device such as a paper tape or card punch. In addition, the analog output signal of the multiplier may be fed back to the analog-to-digital converter to convert the analog signal into digital form, and then stored in the third memory and recorded or observed in digital form.

Other features and advantages of the invention will become apparent from the following description, taken in conjunction with the accompanying drawings, in which.

Figure 2:
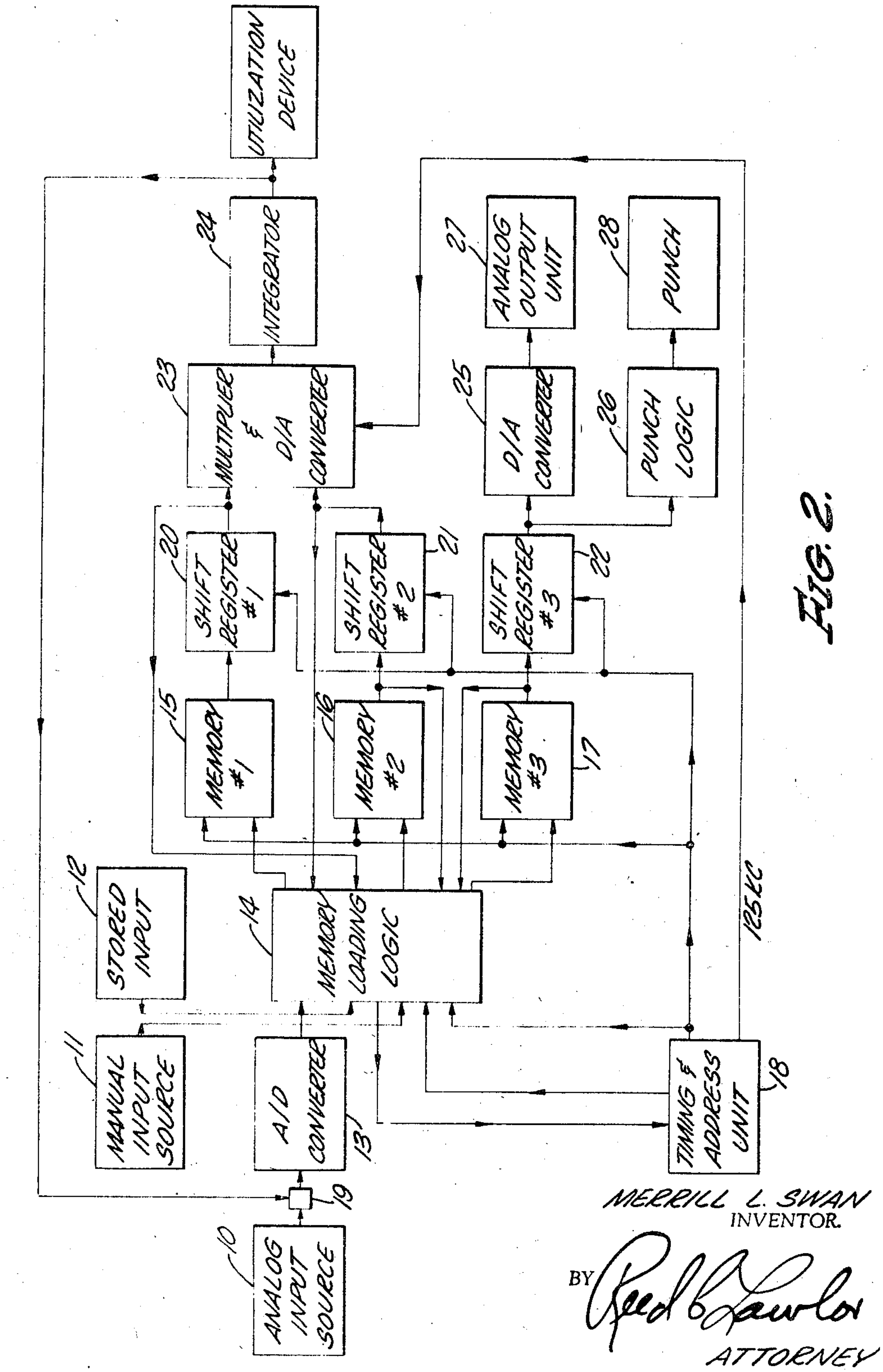
FIG. 2 is a general block diagram of one embodiment of a digital correlation computer embodying the invention.
Figure 6:
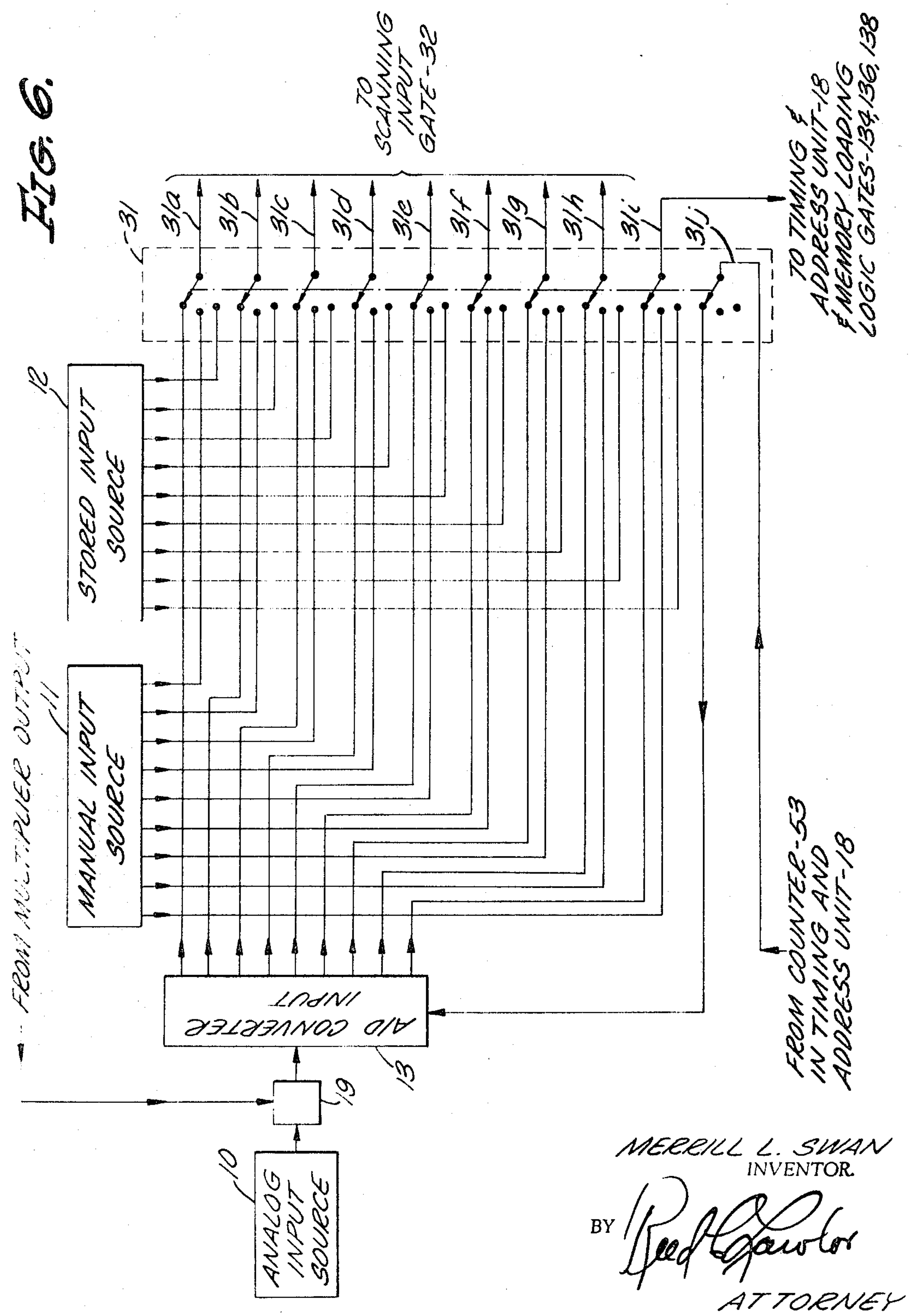
Figure 7:
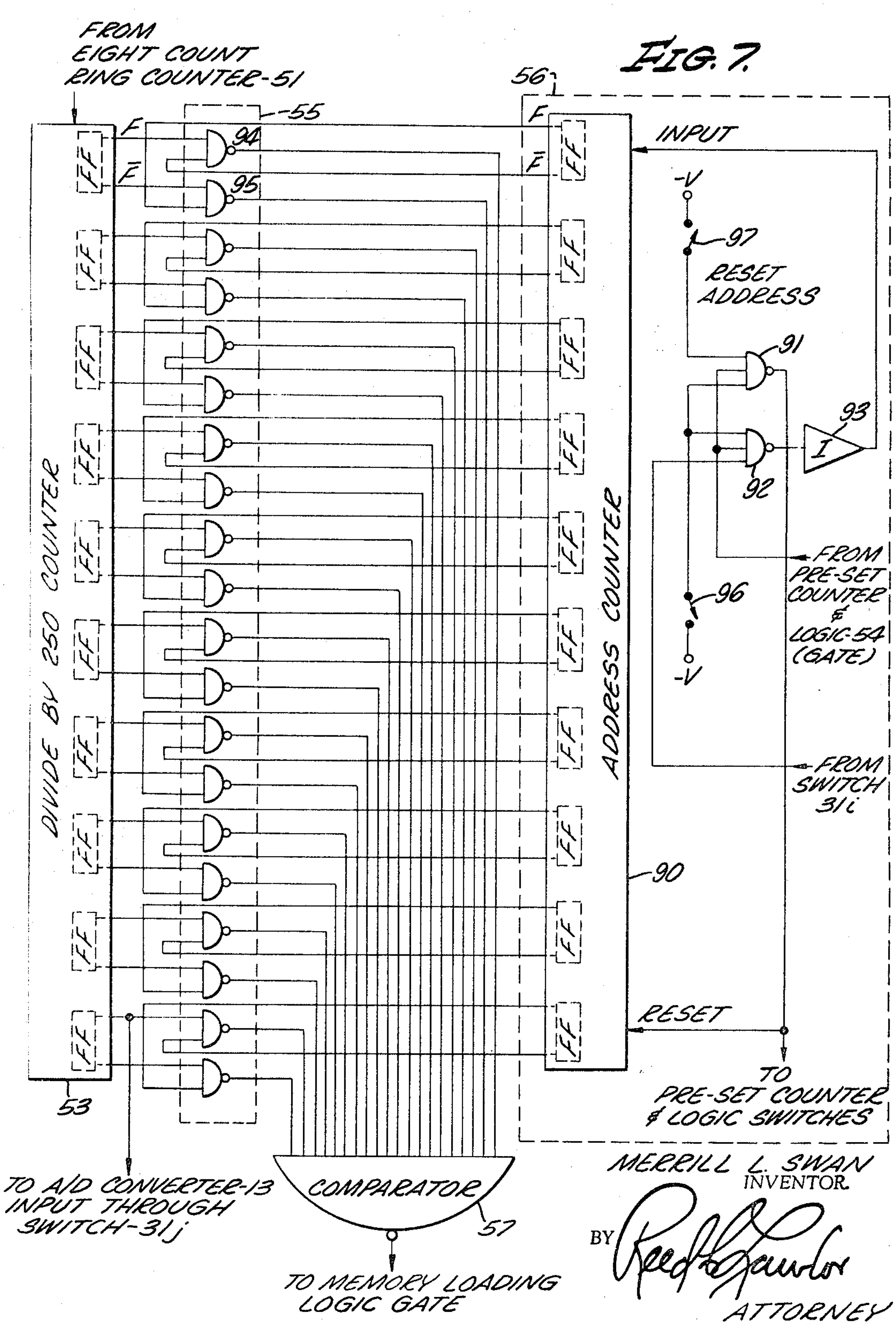
Figure 8:
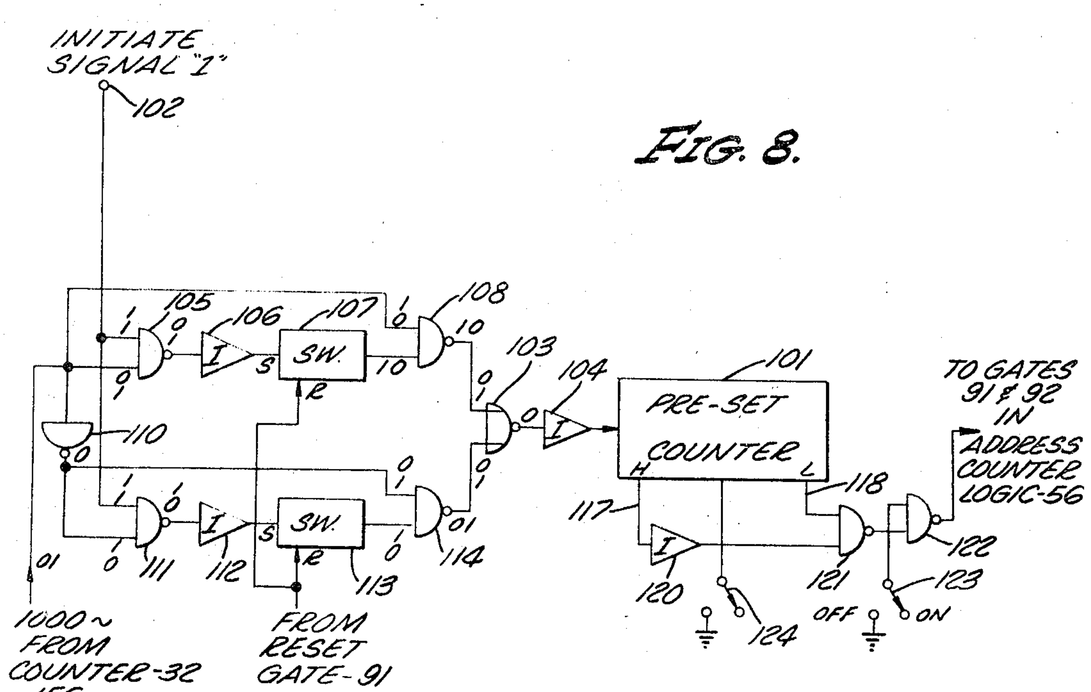
Figure 10:
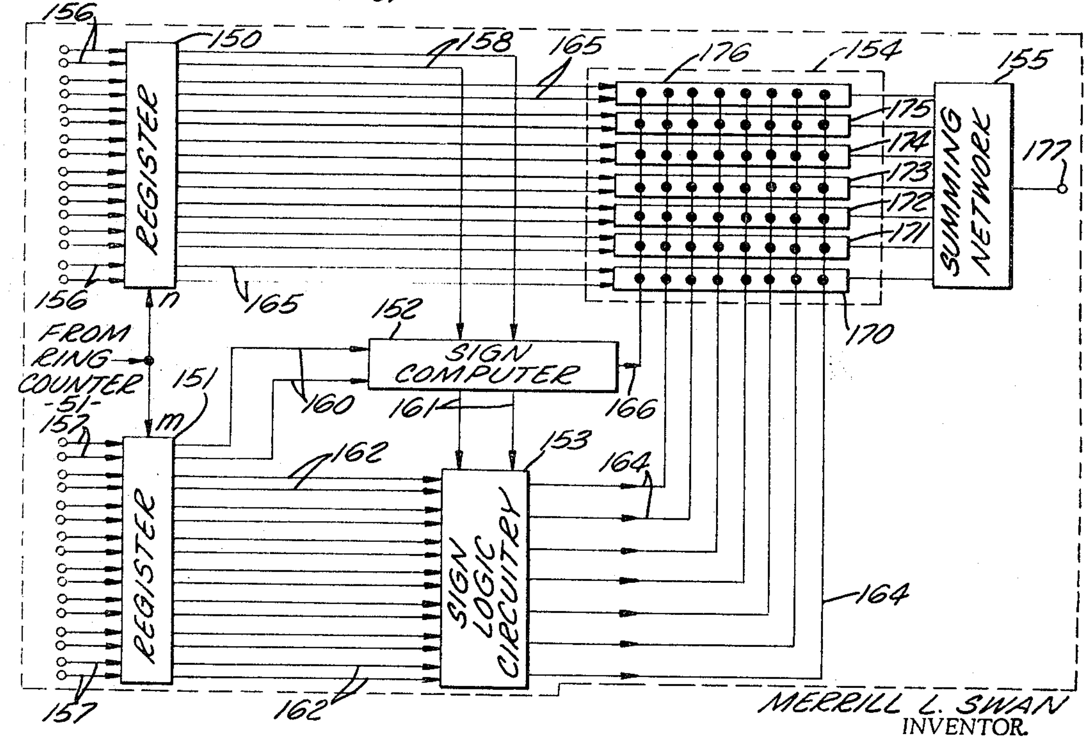
Figure 9:
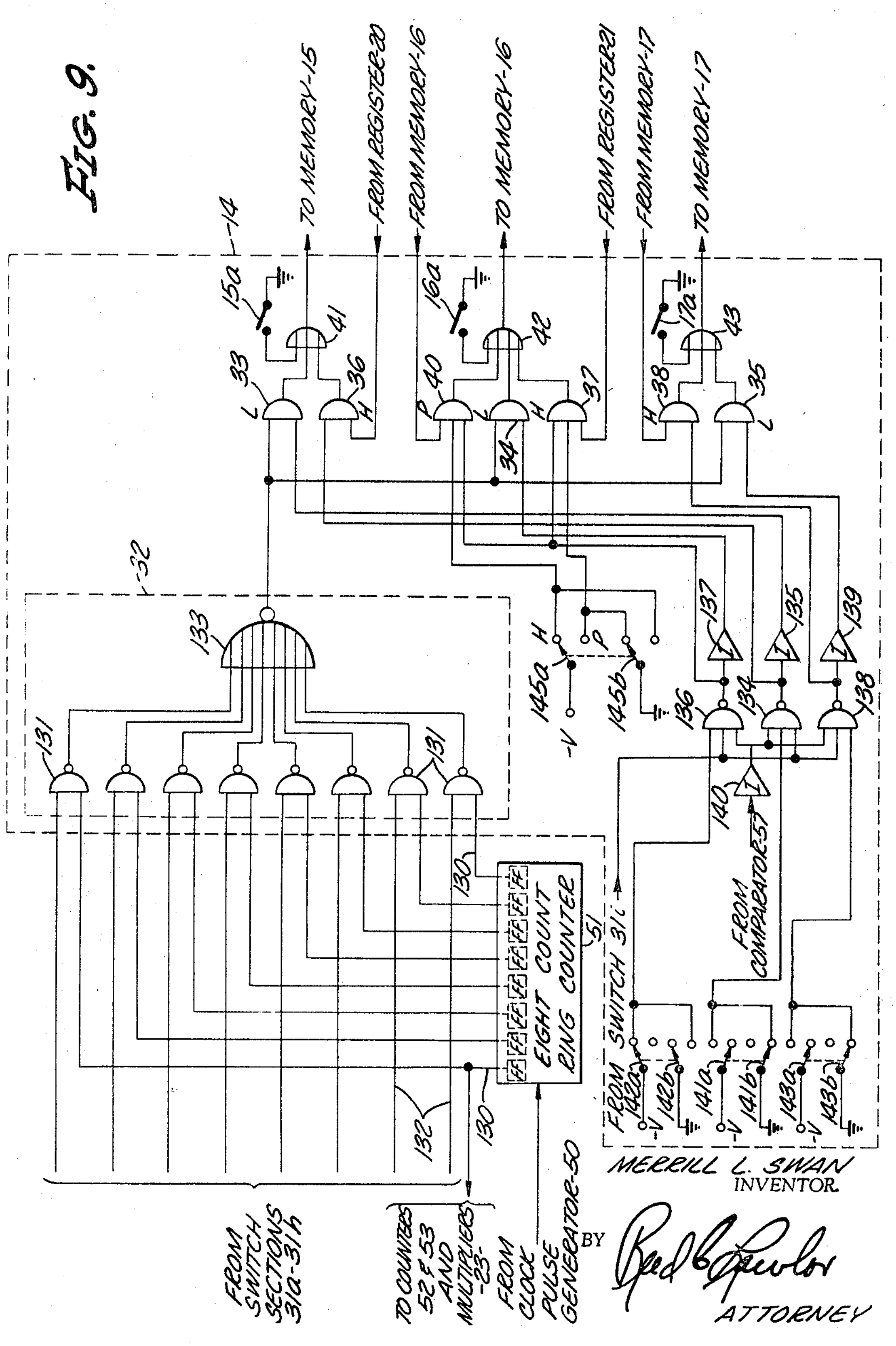
Figure 11:
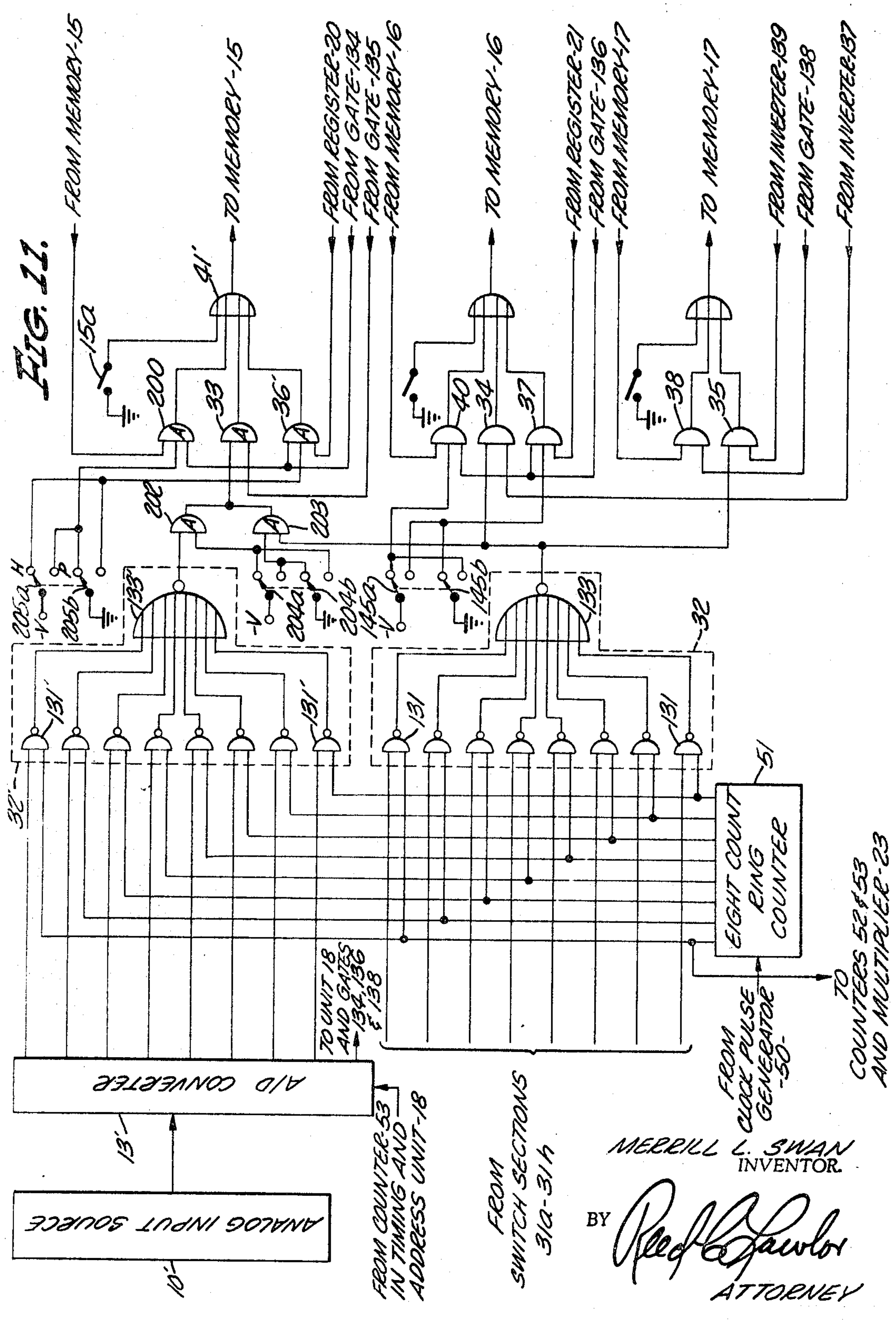

FIGS. *5a–5e* are circuit diagrams of an AND gate, an OR gate, an inverter, a NAND gate, and a NOR gate, respectively, suitable for use in the logic circuitry of the correlation computer;

FIG. 6 is a circuit diagram of the circuitry involved in switching from one type of input to another;

FIG. 7 is a logic diagram of the address counter, its logic circuitry, and a comparator that is driven by the address counter logic circuitry;

FIG. 8 is a logic diagram of a pre-set counter and its logic circuitry is utilized in the invention;

FIG. 9 is a logic diagram of the memory loading logic shown in block form in FIG. 2;

FIG. 10 is a block diagram of the multiplier and digital-to-analog converter utilized in the invention; and FIG. 11 is a logic diagram, similar to FIG. 9 of the memory loading logic of another embodiment of the invention.

GENERAL DESCRIPTION

The digital correlation computer of the invention will be hereinafter described as applied to the correlation of a seismographic recording with a preselected signal, the latter signal being either an analog signal, as from a seismograph trace, or a preselected digital signal supplied to the computer from a manual input or automatically from a stored signal from a record or from a digital computer. It is understood, of course, that the invention is in no way limited to this particular application, but it is being used only as a convenient illustration of the capabilities of the computer of the invention.

When correlating signals, such as might be obtained from a playback of a field seismogram, the correlation is not performed on a continuous basis. Rather, a cross-multiplication (correlation) of two samples of data covering a half-second interval is made each eight microseconds. The data is compressed in time in a ratio of 250:1 in continuously circulating memories. In other words, data from 500 milliseconds of actual record time is circulated in a circulating memory once every two milliseconds. As previously stated, one of the memories may have precessing means associated therewith, which causes the series of numbers stored therein to be variably displaced in time with respect to the reference series of numbers stored in the other memory. Each time that the series of numbers stored in the precessing memory circulates, it is advanced one number in time with respect to the series of numbers stored in the other circulating memory. As the precession occurs, successively selected half-second intervals of data are correlated with the reference data, as the numbers appearing at the output of one memory are successively multiplied by the numbers appearing at the output of the other memory. Thus, every 500 milliseconds, 62,500 multiplication operations are performed. The sum of the products so obtained is a correlation coefficient. The succession of such coefficients obtained provides a cross-correlation function of the two signals. As used herein, "convolving" referes to such a process.

The Mathematics Dictionary by James and James, D. Van Nostrand Company, New York, N.Y., 1959 (Library of Congress Card No. 59–8656), defines "Convolution" as follows:

". . . . The function $$H(x)=\int_{-\infty}^{\infty} f(t)g(x-t)\,dt$$

is sometimes also called a convolution of $f(x)$ and $g(x)$, but is also called a bilateral convolution. . . ."

The term $(x–t)$ means that $f(x)$ is folded or inverted in time. However, in present-day terminology, and particularly in the geophysical arts, the term "convolving" is used to describe a running cross-correlation process whether or not one of the functions being correlated is reversed in time with respect to the other. The term is so used herein.

The correlation computer of the invention is particularly adapted for correlating an analog input signal with a prestored signal. The computer may be used to convolve one seismograph trace with another. This is done by correlating successive portions of one seismograph trace with a small fixed prestored portion of another seismograph trace. The computer may also be used to convolve each of a series of seismograph traces with a single reference trace. Therefore, the invention will be described with reference to that application, although it is understood that it is not limited thereto.

Figure 1:
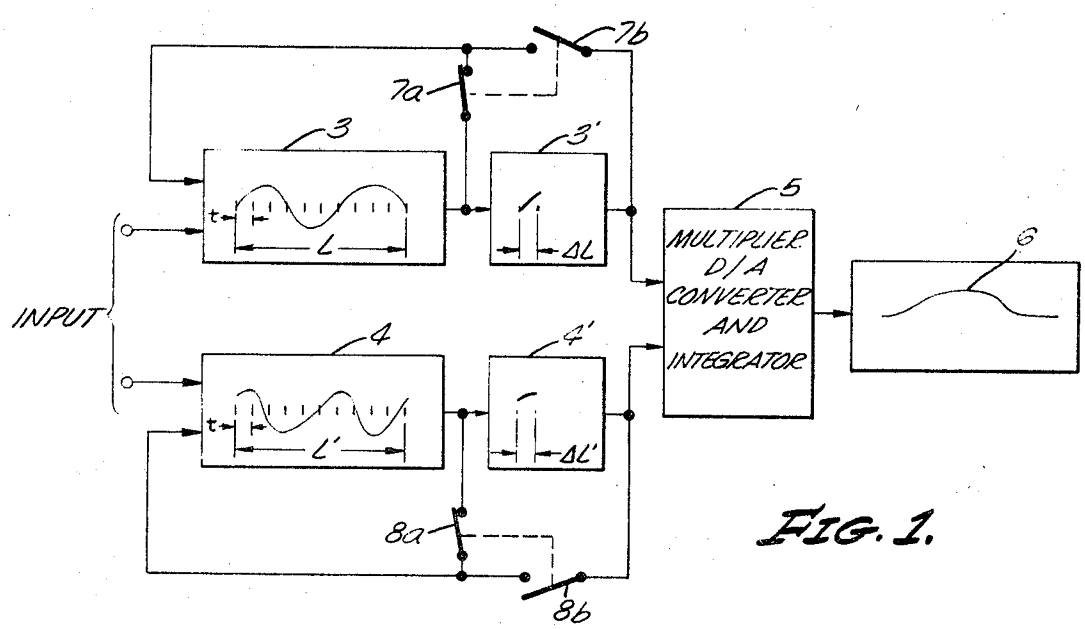
FIGURE 1 is a very generalized block diagram of the computer of the invention.

FIG. 1 illustrates in very generalized form the overall operation of the computer or convolver of the invention. The figure does not include the input devices, timing units or logic necessary for the operation of the computer, but is intended only to present an explanation of the primary function of the invention. The primary function of the invention is to obtain a correlation between two time-varying analog signals, represented by the curves 1 and 2. The two analog signals are sampled to predetermined equal time intervals *t*, and the sampled values are stored as series of digital numbers in circulating memories 3 and 4, respectively, and in shift registers 3' and 4', respectively. Each of the memories 3 and 4 holds 249 eight-bit numbers, and each of the registers 5 and 6 holds one eight-bit number.

The numbers stored in the shift registers 3' and 4' are supplied to a multiplier, digital-to-analog converter and integrator 5, which multiplies together the two digital numbers, converts the product to an analog output signal, and integrates the analog output signals over a pre-determined time period to provide a smooth correlation function such as is represented by the curve 6.

If it is desired to have the series of numbers stored in the memory 4 precess with respect to that series stored in the memory 3, the output of the memory 4 is connected back to its input, while the output of the shift register 3' is connected to the input of the memory 3. Thus, because 249 words are stored in the memory 4 and 250 words are stored in the combination of memory 3 and register 3', the series of words stored in the memory 4 precesses one word with respect to the series stored in memory 3 and register 3' each time the series circulate. In this manner a running cross-correlation is performed between the two series of numbers stored in the two registers.

If it is not desired to perform a running cross-correlation, but rather to correlate two traces without advancing one with respect to the other, the outputs of both memories 3 and 4 may be connected to their respective inputs. The output of the memory 3 is connected to its input through a switch section **7*a*; switch section 7*b*, which is ganged with section 7*a* and must be open when section 7*a* is closed and vice versa, connects the output register 3' to the input of the memory 3. Similarly, a switch section 8*a* connects the output of the memory 4 to its input, and section 8*b* connects the output of the register 4' to the input of the memory 4. The sections 8*a* and 8*b*** are also ganged, and one must be open when the other is closed.

FIG. 2 illustrates one embodiment of a digital correlation computer, or convolver, constructed in accordance with the invention, in general block diagram form. As shown, input to the digital correlation computer of the invention may be from any of three sources, one at a time, that is, from an analog input source 10, a manual input source 11, or a stored input source 12. If the input is in the form of an analog signal from the analog input source 10, it is supplied through a single-pole two-position switch 19 to an analog-to-digital converter 13 which converts the signal into digital form. The converter 13 is of well-known construction and may conveniently be a Model OC–2011 A–D Converter manufactured by Towson Laboratories, Inc., Towson, Md.

The digital input signals from the input sources 11 and 12 and from the analog-to-digital converter 13 are supplied to memory loading logic, or logic unit, 14, from which it is provided to circulating digital memories, or memory units, 15, 16 and 17.

The operation of the entire correlation computer of the invention is controlled by a timing and address unit 18, to be later described in detail, which provides timing signals and address signals to the analog-to-digital converter 13 through the memory loading logic 14 to the memories 15, 16 and 17, the memory loading logic 14, and to shift registers 20, 21 and 22, whose inputs are respectively connected to the outputs of the circulating memories 15, 16 and 17. The output of the shift register 20 is also connected to the memory loading logic so that the digital numbers stored in the memory 15 may be caused to circulate continuously. Similarly, the output of the shift register 21 is connected to the memory loading logic 14 so that the digital numbers stored in the memory 16 may be continuously circulated. However, the output of the memory 16 is also connected to the memory loading logic, so that under the control of the memory loading logic 14, the digital numbers stored in the memory 16 may be caused to precess with respect to those stored in the memory 15 and shift-register 20, if desired.

The outputs of the shift registers 20 and 21 are connected to the inputs of a multiplier and digital-to-analog converter 23, which multiplies together successive digital numbers respectively stored in the memories 15 and 16 and provides analog output signals whose amplitudes are proportional to the products of the successive digital numbers. Multiplier and D/A converter 23 also includes means for providing the analog output signals with one polarity when the algebraic signs of the two numbers being multiplied together are the same and with opposite polarity when the algebraic signs of the two numbers are different. The output signals from the multiplier and digital-to-analog converter 23 are provided to integrating means 24, which may comprise a conventional integrator or a suitable low-pass filter. As was previously mentioned, correlation of the input signals is not accomplished continuously, but rather at discrete sampling intervals. Therefore, the output signal from the multiplier and digital-to-analog converter 23 is in the form of a step-shaped signal which is smoothed by the integrating means 24 and is supplied to a utilization device 29 such as a magnetic tape recorder, oscilloscope, or the like.

As previously mentioned, the memory 17 serves as an auxiliary memory and does not work directly with either of the memories 15 or 16. The output of the memory 17 is provided to the shift register 22 and the output of the shift register 22 may be supplied to either a digital-to-analog converter 25 or to punch logic, or logic unit, 26.

The analog output of the digital-to-analog converter 25 is supplied to an analog output unit 27, such as an oscilloscope or the like for providing a visual display of the analog signal or recording means such as a magnetic tape unit for providing a permanent record of the analog signal. The output signals from the punch logic 26, which may comprise a conventional storage register, are similarly supplied to a punch 28 which may be a conventional card punch or paper tape punch, such as Model 28 LARP, manufactured by Teletype Corporation, Skokie, Ill.

The third memory 17 may be utilized in various ways. For example, it may be utilized in conjunction with the first memory 15 to simultaneously store the same series of digital numbers that are stored in the memory 15. These numbers can then be punched out by the tape punch 28 to provide a permanent record of the numbers stored in the memory 15. Also, the analog output signal of the integrator 24 may be fed back to the input of the analog-to-digital converter 13 through the switch 19, converted into digital signals, and stored in the third memory 17. These digital signals may be converted to analog signals by the digital-to-analog converter 25 and displayed on the analog output unit 27 or the digital signals may be utilized to actuate the punch 28 to provide a permanent record of the output of the integrator 24. Thus, it is seen that the third memory 17 adds a great deal of versatility to the correlation computer of the invention.

Figure 3:
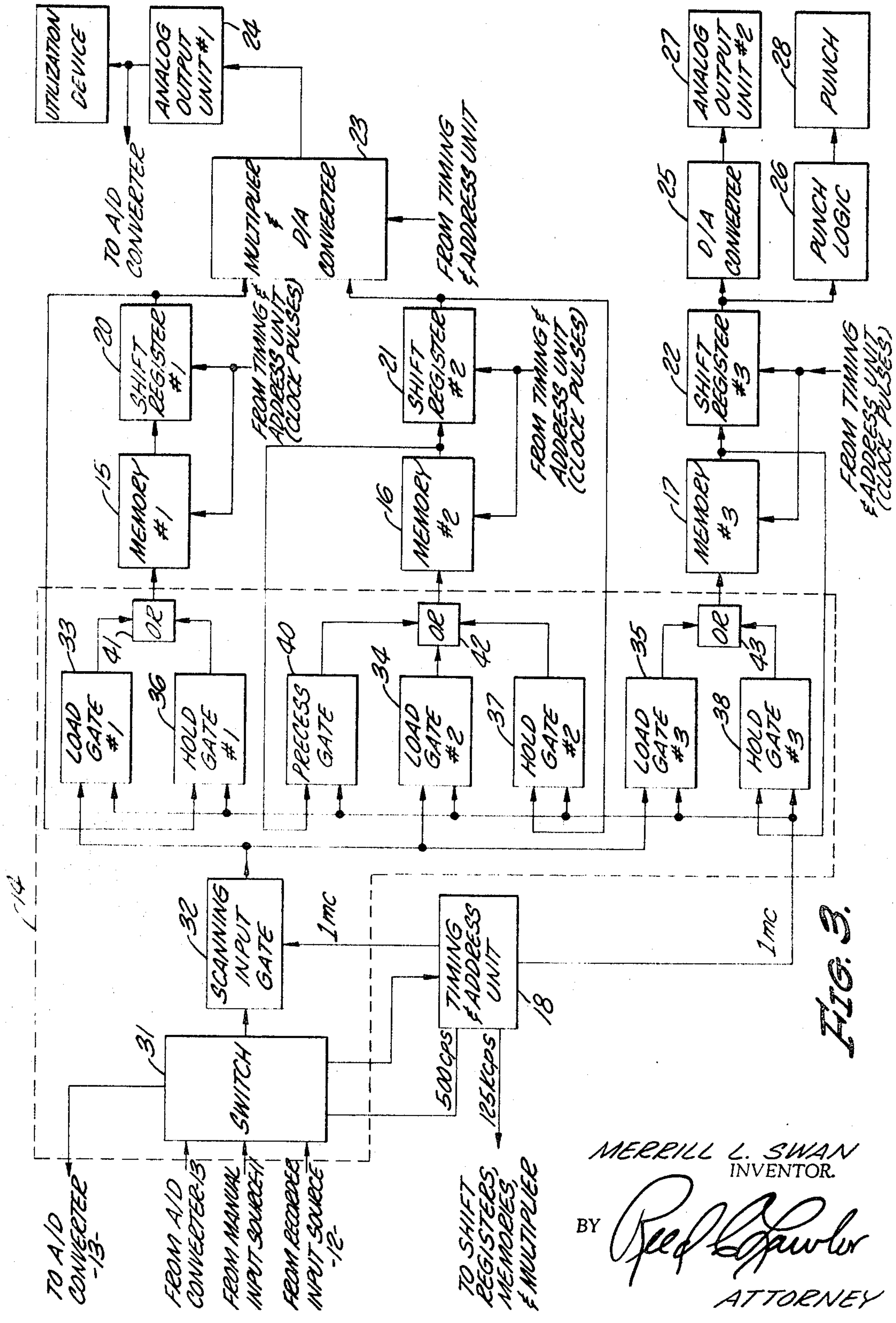
FIG. 3 is a detailed block diagram of the memory-loading logic embodied in the computer shown in FIG. 2.

FIG. 3 shows in more detailed block form the memory loading logic unit 14 shown in FIG. 2. As shown in FIG. 3, the memory loading logic 14 includes a switch 31 having inputs from the analog-to-digital (A/D) converter 13, the manual input source 11, the recorded input source 12, and the timing and address unit 18. It also has outputs to the A/D converter 13, to a scanning input gate 32, and to the timing and address unit 18. As will later be described in detail, the switch 31 serves a number of functions. First, it serves to provide signals from one of the three input sources to the input scanning gate 32. Second, it serves to provide a "command encode" signal from the timing and address unit to the D/A converter 13, and to provide a "data available" signal from the converter 13 to the timing and address unit.

A word comprises eight binary bits, seven of which represent a digital number, and the eighth of which (the most significant bit) represents the algebraic sign of the number. The digital input number is provided to the scanning input gate 32 through the switch 31 in parallel, that is, all eight bits are supplied simultaneously. The scanning input gate 32 serves, under control of the timing and address unit 18, to convert those parallel signals into series signals for loading the various memories, one bit at a time. That action will be described hereinafter in detail with reference to FIGS. 9 and 11.

The serial output from the scanning input gate 32 representing a series of digital numbers is provided simultaneously to three load gates 33, 34, and 35 respectively associated with the three memories 15, 16 and 17. The load gates 33, 34, and 35 also receive signals from the timing and address unit 18, which signals cause one or more of the load gates to pass the signals received from the scanning input gate 32.

Each of the memories 15, 16 and 17 is also provided with a hold gate 36, 37 and 38, respectively. The hold gate 36 has an input connected to the output of the shift register 20, the hold gate 37 has an input connected to the output of the shift register 21, and the hold gate 38 has an input connected to the output of the memory 17. All of the hold gates also have inputs connected to the timing and address unit, signals from which serve to open or close the hold gates. The memory 16 is also provided with a precess gate 40, which receives input signals from the output of the memory 16 and from the timing and address unit 18.

The two output signals from the load gate 33 and from the hold gate 36 are supplied as input signals to an OR gate 41, whose output is supplied as an input signal to the memory 15.

Teh hold gates 36, 37 and 38 serve, under control of the timing and address unit 18, to permit continuous circulation of the series of digital numbers stored in the circulating memories 15, 16 and 17, respectively. It is pointed out that the shift registers 20 and 21 act as part of the memories 15 and 16, respectively, when data is being continuously circulated in the memories.

In the particular embodiment of the invention being described, it is desired to store 250, 8-bit digital words in each combination of memory 15 and shift register 20 and in memory 16 and shift register 21. Therefore, the memories 15 and 16 are so constructed as to store 249 of such words with each shift register 20 and 21 being so constructed as to store one 8-bit word each. The memory 17, on the other hand, is so constructed as to store 250 8-bit words. Thus, the series of words stored in the memory 15 and shift register 20 continually recirculate unless the memory is cleared, in a manner to be later described. Similarly, the series of words stored in the memory 17 continuously recirculate until that memory is cleared. The series of words stored in the memory 16 and shift register 21 can be continuously recirculated if the output from the shift register 21 is fed back to the input of the memory through the hold gate 37. On the other hand, however, if the output of the memory 16 is fed back to the input of the memory through the precess gate 40, the series of words stored in that memory will precess one number each time the series is circulated, with respect to the series of numbers stored in the memory 15. Each time the series of words stored in the memory 16 precesses, a new word is entered through the load gate 34 while an old word is erased. This action will be later explained in more detail.

As was previously explained with reference to FIG. 2, the output signals from shift registers 20 and 21 are provided to a multiplier and digital-to-analog converter 24, which provides a step-shaped analog output signal. That analog output signal is smoothed in the integrator 24 and displayed for visual observation or recorded for future use. In the present case, the integartor 24 has a long time constant, of the order of several seconds, so that the analog output signal is summed over a two millisecond period. The output signals from the shift register 22 are provided to the digital-to-analog converter 25 or to punch logic, or punch logic unit, 26, either for visual display or to drive a paper tape punch.

Figure 4:
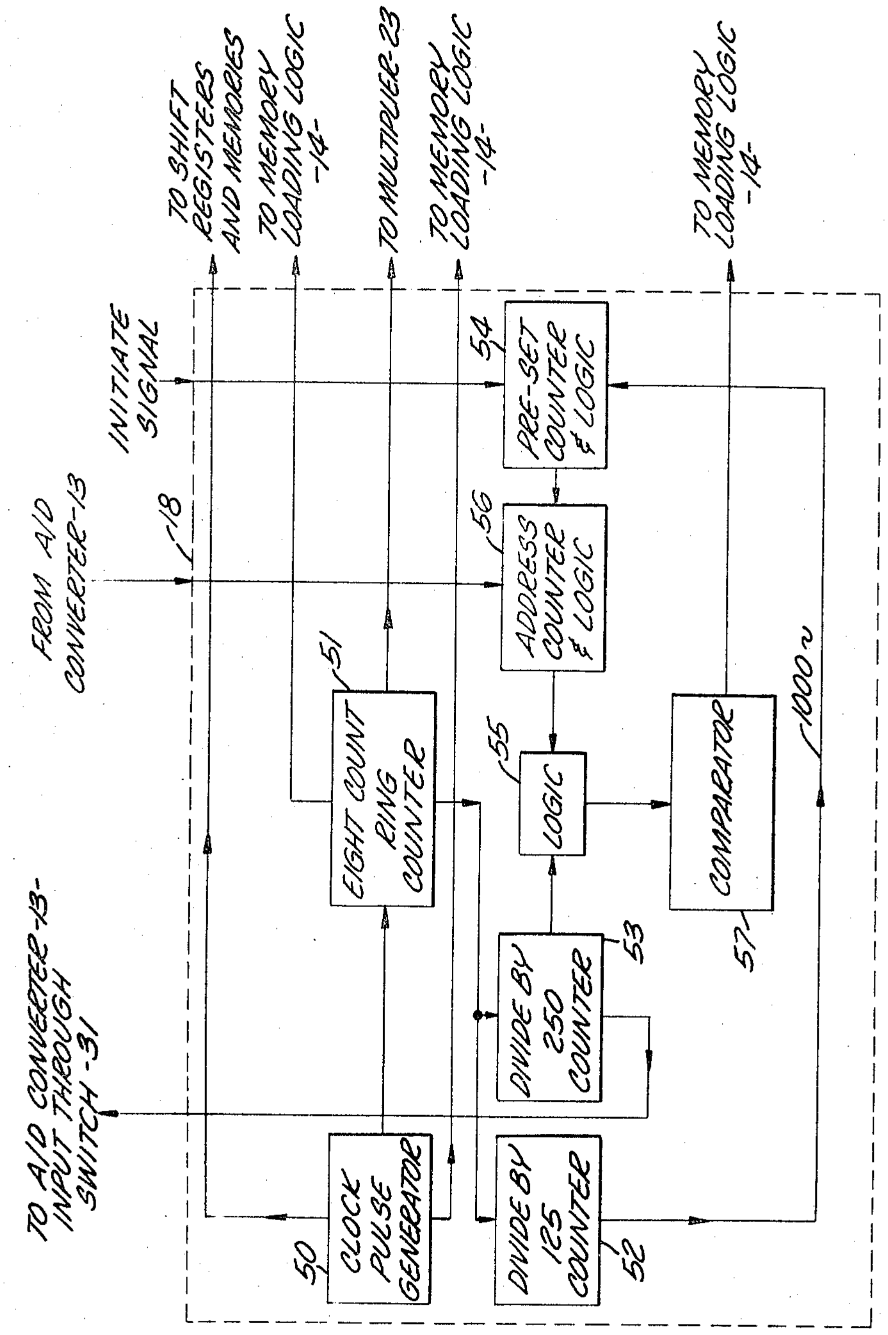
FIG. 4 is a block diagram of the timing and address unit embodied in the computer of the invention.

FIG. 4 is a more detailed block diagram of the timing and address unit 18 shown in FIGS. 2 and 3. The timing address unit 18 provides the basic timing for all portions of the correlation computer requiring synchronized timing and serves to load digital numbers into the various memories at the proper times. Before discussing FIG. 4, it is believed advisable to discuss the memories 15, 16 and 17 in order to more fully appreciate the function of the timing and address unit shown in FIG. 3. The memories 15, 16 and 17 have been previously referred to as circulating memories, a circulating memory being defined as a loop or closed transmission path of some kind, the path length being chosen so that some predetermined number of unit signals may circulate without interfering one with another. In the best embodiment of the invention, each memory comprises a delay line. Various types of delay lines suitable as circulating memories are well known in the art, and the term is taken to include mercury, quartz, magnetostrictive lines, electrical transmission lines, and piezo-electric storage. The various types are discussed in a book entitled "Digital Computer Components and Circuits" by R. K. Richards, published by Van Nostrand Company, Inc., 1957, Library of Congress, Catalog Card No. 57–13454, starting at page 282. In the best embodiment of the invention, each circulating memory unit comprises a magnetostrictive delay line, such as one identified as Serial Memory PAC Model SM–30, manufactured by Computer Control Company, Framingham, Massachusetts.

One of the more important features of the invention is that time compression occurs as data is stored in the circulating memories. In the present example, data from the analog input source 10 to the A/D converter 13 is sampled by the converter 13 every two milliseconds. However, when the data is stored in the circulating memory, it is compressed in time by a ratio of 250:1. That is, the 250 digital numbers stored in one of the memories, which circulate in the memory once every two milliseconds, represents 0.5 second of actual time over which the analog signal is sampled. The timing and address unit 18 provide time compression function and insures that the digital numbers are loaded into the memories in proper sequence and not one on top of another.

As shown in FIG. 3, basic timing for the entire computer is provided by a clock pulse generator 50, which, in the present embodiment, provides clock pulses at a one megacycle per second frequency. The one megacycle pulses are provided to the shift registers 20, 21 and 22, to the memory loading logic 14 and to an eight-count ring counter 51. Suitable clock pulse generators are manufactured by Wyle Laboratories, El Segundo, Calif.

The eight-count ring counter 51 comprises eight flipflops and is so designed that only one flipflop is in the "1" condition at any time during an eight-count cycle. Each succeeding flipflop is set to the "1" condition as the preceding flipflop is set to the "0" condition. Therefore, each flipflop will be set to the "1" condition once every eight microseconds. These eight consecutive pulses are provided to the memory loading logic 14 so that the parallel output of the analog-to-digital converter 13 is changed to series form for loading data into the delay lines. A second type of output from the ring counter 51 is a single pulse which occurs approximately every eight microseconds. These pulses are provided to the multiplier and D/A converter 23 for a purpose to be later described. A suitable counter 51 is also made by the aforementioned Wyle Laboratories. Such counters are conventional and well known in the art. A similar pulse approximately one microsecond long, which is repeated each eight microseconds, is also sent to a divide-by-125 counter 52 and to a divide-by-250 counter 53.

The output of the counter 52 is a 1,000 pulse per second (p.p.s.) signal which is provided to a pre-set counter and logic, or counter and logic unit, 54, and the output of the counter 53 is a 500 p.p.s. signal which is sent to the A/D converter 13 as the "command encode" signal previously mentioned.

The 500 p.p.s. signal from the counter 53 is also sent to logic circuitry 55, which also receives a signal from an address counter and logic, or counter and logic unit, 56. An output signal from the logic circuitry 55 is provided to a comparator 57, and, when the signal provided by the address counter and logic 56 is identical to that provided by the counter 53, a signal is provided on the output of the comparator 57 and supplied to the memory loading logic 14. This latter signal serves to control loading of the memories so that time compression of the input signals occurs and the signals are loaded in proper time sequence and position. The pre-set counter and logic 54 also receives an initiate signal which causes the pre-set counter to start counting to the predetermined number of the 1,000 p.p.s. signals received from the counter 52. The counters 52 and 53 are conventional and may be designed in accordance with the principles set forth in chapter 7 of a book entitled "Arithmetic Operations in Digital Computers" by R. K. Richards, D. Van Nostrand Company, Inc., 1955, Library of Congress, Card No. 55–6234. They are also manufactured by Anadex Instruments, Inc., Van Nuys, Calif., and by Wyle Laboratories, El Segundo, Calif.

The pre-set counter and logic 54 counts a predetermined number of pulses provided by the counter 52 so that a particular desired segment of data may be loaded into one of the memories. The output signal from the pre-set counter and logic 54 actuates the address counter and logic 56 so that a signal may be provided from the comparator 57 to open the memory loading logic gates at the desired time, and, in the present example, for 0.5 second thereafter, after which interval the gates are again closed. The address counter and logic 56 also receives a signal from the A/D converter 13 to indicate that data is available and hence can be loaded into the memories.

To recapitulate briefly, the digital correlation computer of the invention performs a cross-multiplication of two samples of data every eight microseconds. In other words, it makes a "multiplication sweep" every 0.5 second and performs 62,500 multiplications during that 0.5 second period. Input to the computer can be from an analog input source, a manual input source, or a stored input source. If the input is from an analog input source, it is converted into digital form and loaded into one or more of the three circulating memories of the device. Similarly, data in the form of a series of digital numbers can be loaded into another circulating memory. The two numbers respectively appearing at the outputs of the two circulating memories are multiplied together and the resulting products are integrated to provide an analog output signal representative of a point of the correlation function of the two series of numbers. The analog output signal from the computer may either be used directly, as by recording, or it may be fed back into the computer to obtain a digital output that may be permanently recorded in the form of punched paper tape or the like.

It is again pointed out that, in the present example, data is compressed in time in the circulating memories by a ratio of 250:1 in the case of continuously time varying analog input data. Of course, if the input data is in the form of digital numbers from the manual input source 11 or the recorded input source 12, it may be compressed in time by a much greater amount. Nevertheless, 250 eight-bit words stored in each of two circulating memories are cross-multiplied every two milliseconds. The data stored in one of the circuating memories can be caused to precess with respect to the data stored in the other memory by one word every two milliseconds.

A third circulating memory is provided as an auxiliary memory which provides either analog or digital output signals to provide a record of the data stored in one of the other memories or of data fed back to the computer from its analog output.

DETAILED DESCRIPTION

Before proceeding with a detailed description of the logic circuitry embodied in the digital correlation computer, consider the fundamental gating and inverting circuits involved in the logic circuitry. In the present case, the signals supplied to such circuitry are either at substantially ground potential or are at substantially minus 10 volts. Specifically, a binary "0" is defined as a zero volt signal, and a binary "1" is defined as a −10 volt signal. Of course, these particular voltage levels are merely representative and are not to be considered as a limitation in any sense. Various modifications in voltage levels and specific circuitry may easily be made by one skilled in the art without departing from the invention.

Figure 5A:
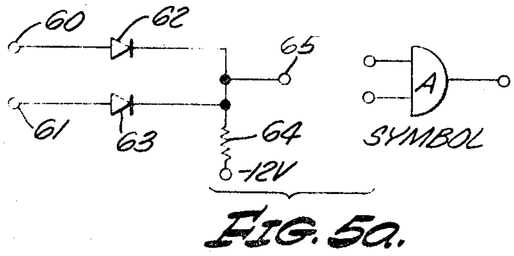

FIG. 5*a* shows a typical AND circuit suitable for use in the circuitry of the invention. Input terminals 60 and 61 for receiving two negative-going input signals are connected to the anodes of diodes 62 and 63, respectively. The cathodes of diodes 62 and 63 are connected together and to one end of a resistor 64 whose other end is connected to a source of −12 volts DC. An output terminal 65 is also connected to the cathodes of the diodes 62 and 63. So long as the signal supplied to either of the terminals 60 and 61 is at ground potential, current will flow through one of the diodes 62 or 63 and the output terminal 65 will be substantially at ground potential. However, if equal negative signals are supplied simultaneously to both terminals 60 and 61, the potential at the output terminal 65 will be substantially equal to the negative potentials supplied to the input terminals 60 and 61.

Figure 5D:
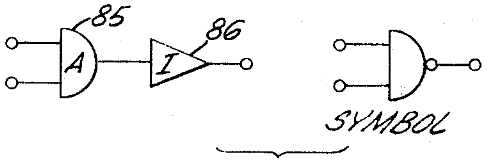
Figure 5B:
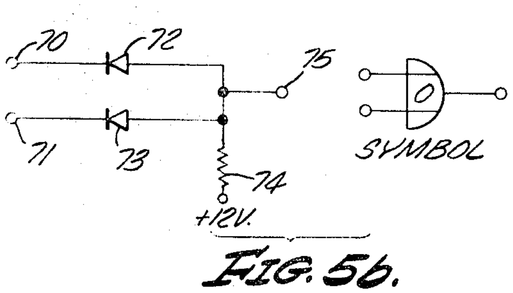

FIG. 5*b* illustrates a typical OR circuit such as might be used in the circuitry of the invention. A pair of input terminals 70 and 71 for receiving negative-going input signals are connected to the cathodes of diodes 72 and 73, respectively. The anodes of the diodes 72 and 73 are connected together and to one end of a resistor 74, the other end of which is connected to a source of +12 volts DC. An output terminal 75 is also connected to the anodes of the diodes 72 and 73. In operation, if the signal at either of the input terminals 70 or 71 is at ground potential, current flows from the +12 volt source through the resistor 74 and the output terminal 75 is at approximately ground potential. If now a negative input signal is supplied to at least one of the input terminals 70 or 71, increased current will flow through the resistor 74 and the output terminal will be approximately at the voltage level of the input signal. In the present case, the input signals supplied to the terminals 70 and 71 are either at ground potential, current flows from the +12 volt source through output terminal 75 varies between approximately ground potential and approximately −10 volts.

Figure 5E:
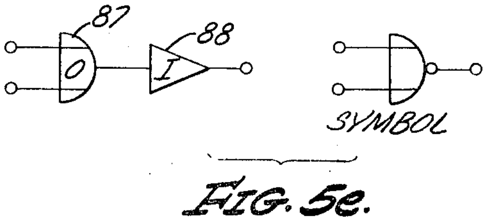
Figure 5C:
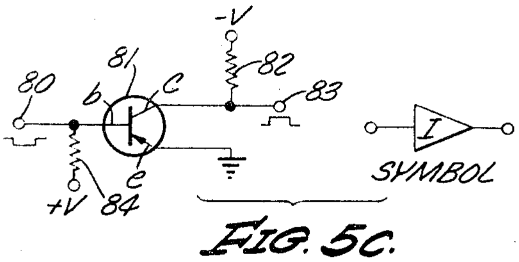

FIG. 5*c* illustrates a typical inverter circuit that may be used in the circuitry of the invention. As shown, an input terminal 80 is connected to the base *b* of a PNP type transistor 81, whose emitter *e* is grounded. The collector *c* of the transistor 81 is connected through a resistor 82 to a source of negative voltage −V and to an output terminal 83. The base of the transistor 81 is also connected through a resistor 84 to a source of positive potential +V. In operation, when a zero-voltage input signal is applied to the terminal 80, the transistor 81 is biased to cutoff by the positive potential on its base and the output terminal 83 is at a negative potential equal to that applied to the collector of the transistor. When a negative voltage of sufficient amplitude to overcome the positive bias applied to the base of the transistor is supplied to the terminal 80, the transistor is driven into saturation and the output terminal 83 rises to approximately ground potential. Thus, a negative-going input signal is inverted to provide a positive-going output signal.

It will be understood that the foregoing examples of AND, OR and inverter circuits are presented as illustrative only, and that various other conventional well-known circuits may be used in their stead. It was previously stated in connection with the description of FIGS. 4*a*–4*c* that the signals applied to the input terminals of those circuits are either zero volts or −10 volts. Those are the basic logic levels utilized in the system of the invention and will be adhered to hereinafter.

FIGS. 5*d* and 5*e* respectively show NAND and NOR gates. The NAND gate consists of an AND gate 85 followed by an inverter 86. Thus, if there are "1" signals supplied to both inputs of the AND gate 85, it will provide a "1" output, which will be inverted to provide a "0" output from the inverter 86. If "0" signals are supplied to one or both inputs to the AND gate 85, the output of the gate 85 will be a "0," which will be inverted to provide a "1" output from the inverter 86.

The NOR gate shown in FIG. 5*e* comprises an OR gate 87, followed by an inverter 88. If either or both inputs to the OR gate 87 are "1" signals, the output signal will be a "1," which will be inverted to provide a "0" output from the inverter 88. If both inputs to the OR gate 87 are "0" signals, the output signal will be a "0," which will be inverted to provide a "1" output from the inverter 88.

In order to understand more readily the logic circuitry to be hereinafter explained, it is first necessary to consider the particular binary code used throughout the system. As previously mentioned, for purposes of illustration, an 8-bit code has been chosen in which seven bits represent a number and the eighth, the most significant bit, represents the algebraic sign of the number. In the particular code utilized, if the sign bit is a binary "1," the algebraic sign of the number is negative, whereas, if the sign bit is a "0," the algebraic sign of the number is positive. The following Table I shows illustrative values of the binary code and corresponding decimal numbers.

TABLE I

| *Binary* | *Decimal* |
|---|---|
| 1 1 1 1 1 1 1 1 | −127 |
| 1 0 1 1 1 1 1 1 | −63 |
| . | |
| . | |
| . | |
| 1 0 0 0 0 0 1 1 | −3 |
| 1 0 0 0 0 0 0 1 | −1 |
| 1 0 0 0 0 0 0 0 | 0 |
| 0 0 0 0 0 0 0 0 | 0 |
| 0 0 0 0 0 0 0 1 | +1 |
| 0 0 0 0 0 0 1 1 | +3 |
| . | |
| . | |
| . | |
| 0 1 1 1 1 1 1 1 | +127 |

FIG. 6 illustrates the input switching circuit including the switch 31 previously mentioned in connection with the description of FIG. 3. As previously mentioned, an 8-bit binary code is used in this system, 7 bits of which represent a number, and the 8th, the most significant bit, represents the algebraic sign of the number. The switch 31 is a 10-section, single pole, 3-position switch, 8 sections of which are used to supply the 8-bit digital signal to the scanning input gate 32, the ninth section of which is utilized to supply the "data available" signal from the input sources to the timing and address unit 18 and the memory loading logic 14, and the tenth section of which is used to supply the "command encode" signal from the counter 53 in the timing and address unit 18 to the analog digital converter input 13. The various sections of the switch 31 are designated 31*a*–31*j*. The eight output lines from the A/D converter 13 carrying the digital number and its algebraic sign are connected to corresponding contacts of the switch sections 31*a*–31*h*, the output line from the converter 13 carrying the "data available" signal is connected to a corresponding contact on the switch section 31*i*, and the corresponding section on the switch section 31*j* is connected to the converter 13 to receive the "command encode" signal from the counter 53 in the timing and address unit 18. Similarly, signals representing the digital number are applied from the output lines of the manual input source 11 to corresponding contacts of the switch sections 31*a*–31*h* and the "data available" signal is applied from the manual input source 11 to a corresponding contact on the switch section 31*i*. Signals representing the 8-bit digital number are applied on output lines from the recorded input source 12 to the switch sections 31*a*–31*h* and the "data available" signal is applied from the source 12 to a corresponding contact on the switch section 31*i*. No "command encode" signals are needed for the manual input source 11 or the stored input source 12 so that two contacts of the switch section 31*j* are unused.

It is assumed that the analog signals provided from the analog input source 10 vary as a function of time and that they have both positive and negative excursions about a reference, or zero, level. The analog input source may be of any conventional type, such as magnetic tape, magnetic drum, or of other well-known design.

The manual input source 11 may comprise a conventional device such as a keyboard, and the stored input source 12 may be similar to the analog input source 10, except that the signals stored therein are in digital rather than analog form. Also, the stored input source 12 may comprise a tape reader for reading a digital code punched into paper tape. A suitable device is the Model LX–800 tape reader, manufactured by Teletype Corporation, Skokie, Ill.

FIG. 7 illustrates in more detail than FIG. 4 the divide-by-250 counter 53, the logic unit 55, the address counter and logic unit 56 and the comparator 57. The counter 53 continuously receives one microsecond pulses spaced eight microseconds apart from the ring counter 51. The counter 53 comprises 10 flipflop circuits and the flipflop at the end of the count changes from the "0" condition to the "1" condition once every 2,000 microseconds. The pulse supplied from the last flip-flop of the counter 53 to the analog digital converter 13 through switch 31*j* is the basic timing pulse for the entire system.

The address counter and logic unit 56 comprises an address counter 90 and logic circuitry comprising two NAND gates 91, 92, and an inverter, 93. The counter 90 may be identical to the counter 53.

Each of the counters 53 and 90 comprises ten flipflops, each of which has a signal output F, and the complement $\overline{F}$ of the signal output.

The purpose of the logic 55 is to provide an output from the comparator 57 when the addresses in the counters 53 and 90 match each other. In order to do this, twenty NAND gates are provided, only two of which, designated 94 and 95, will be described, inasmuch as the other NAND gates operate in a similar manner. The output of the comparator 57 (a NAND gate) will be a "0" signal only when all of the twenty input signals to the comparator are "1." Looking now at the NAND gates 94 and 95, it is seen that one input to gate 94 is connected to receive the signal F from the first flip-flop in the counter 53 and to receive the complementary signal $\overline{F}$ from the first flipflop in the counter 90. Similarly, the flipflop 95 is connected to receive the complementary signal $\overline{F}$ from the counter 53 and the signal F from the first flipflop in the address counter 90. Thus, if the output signals of the first flipflops in each of the counters 53 and 90 are the same, the NAND gate 94 will produce a "1" output signal and the NAND gate 95 will also produce a "1" output signal. Similarly, if all of the outputs of the counters 53 and 90 agree, there will be "1" outputs from all of the NAND gates 94 and 95, which will provide a "0" output from the comparator 57. Thus, there is only one unique time during each 2,000 microsecond period that all flipflop combinations in the two counters 53 and 90 are identical. When they are identical, it will produce one 8-microsecond long "0" pulse which is provided from the comparator 57 to the memory-loading logic, inverted to a "1" pulse and used to permit data to be loaded into the memories 15, 16 and 17.

There will be only one 8-microsecond long period during each 2000 microsecond period when the numbers stored in counters 53 and 90 will be the same. Thus, the setting of the address counter 90 controls at what time 8-microseconds of data can be loaded into any one of the memories.

The NAND gate 92 and inverter 93 serve as count input gates to the address counter 90, while the NAND gate 91 serves as a reset gate. In order for a count signal to be provided from the inverter 93, input signals to the NAND gate 92 must all be "1" from the preset counter and logic 54, from the input sources through the switch section 31*i* (indicating "data available"), and from a switch 96, which serves as a "circulate-precess" switch, that must be in the precess position to supply a negative voltage (a "1" signal) to the input of the gate 92. If all of the inputs to the gate 92 are "1's," there will be a "0" output, which is inverted by the inverter 93 to provide a "1" input signal to the address counter 90.

The address counter 90 can be reset to zero address count at any time by closing a switch 97 when the preset counter and logic unit is turned off and the switch 96 is closed. When the preset counter and logic unit 54 is turned on, the reset gate 91 is automatically turned on so that the pre-set counter and logic unit 54 controls resetting of the address counter 90.

FIG. 8 illustrates the pre-set counter and logic unit 54 shown in block form in FIG. 4. The function of the pre-set counter and logic unit 54 is to provide that a selected 0.5 second of analog data may be sampled once every two milliseconds and stored in one of the circulating memories. The pre-set counter and logic unit 54 comprises a counter 101 having a dial which may be set to the beginning of a particular desired time period and having a second dial which may be set to the end of that time period. The pre-set counter 101 is triggered by a "1" initiate signal provided to an input terminal 102. Input to the pre-set counter comprises two lines which feed a NOR gate 103 followed by an inverter 104, whose output provides the input signal to the pre-set counter 101. Input to the NOR gate 103 is from either of two channels. The first comprises a NAND gate 105 and an inverter 106, a switch 107 and a NAND gate 108. The second channel comprises an inverter 110, a NAND gate 111 and an inverter 112, a switch 113, and a NAND gate 114.

The signal supplied to the input terminal 102 indicates time zero, so far as the pre-set counter and logic unit 54 is concerned. The initiate signal supplied to the terminal 102 may be supplied from an analog recording or from any other source when it is desired to initiate counting by the pre-set counter 101. The pre-set counter 101 will start counting within a time of 0.5 millisecond from the start of the initiate signal applied to the terminal 102.

Pulses from the counter 52 in the timing and address unit 18 are also supplied at a rate of 1000 pulses per second as input signals to the pre-set counter and logic 54. The pre-set counter 101 will start counting at the first leading or trailing edge of one of the 1000 p.p.s. signals received after the initiate signal has been supplied to the terminal 102. The initiate signal supplied to the terminal 102, which is a "1" signal, must open one of the two input channels to the NOR gate 103, the channel being opened or not depending upon whether the initiate signal corresponds in time with one of the 1000 p.p.s. pulses from the counter 52, or not. Thereafter, the particular channel opened remains open, so that 1000 p.p.s. pulses pass therethrough and are counted by the pre-set counter 101.

Assume first that a "1" signal is received on the terminal 102 while a "0" signal is received from the 1000 cycle counter 52. The "0" signal from the 1000 cycle counter 52 will be inverted by the NAND gate 110 and thus "1" signals will be applied to both inputs of the NAND gate 111, which will provide a "0" output signal. The "0" output signal from the gate 111 will be inverted by the inverter 112 to provide a "1" signal to the switch 113, thus turning it on and providing a "1" output signal from it. The "1" output signals from the switch 113 and from the output of the gate 110 are applied as inputs to the NAND gate 114, which will provide a "0" input signal to the NOR gate 103. Looking at the other channel, a "1" input signal will be applied to the NAND gate 105 from the terminal 102, and a "0" input signal will be applied from the 1000 cycle counter 52. Thus the output of the gate 105 will be a "1" signal, the output of the inverter 106 will be a "0" signal, and the switch 107 will not be turned on. Therefore, two "0" signals will be supplied as inputs to the NAND gate 108 to provide a "1" output signal, which will be supplied as an input to the NOR gate 103. The output signal of the NOR gate 103 will be a "0" signal, which is inverted by the inverter 104 to provide a "1" to the pre-set counter 101 to start it counting.

Conversely, if a "1" signal is applied from the input terminal 102 at the same time that a "1" signal is being supplied from the 1000 cycle counter 52, the other channel will be opened. In that case, two "1" signals would be supplied to the NAND gate 105, to produce a "0" output signal, which is inverted by the inverter 106 to provide a "1" output signal and set the switch 107. At the same time, "1" and "0" signals are supplied to the NAND gate 111 to provide a "1" output signal which is inverted by the inverter 112 to provide a "0" output signal and prevent the switch 113 from being set. Thus, the input signals to the NAND gate 114 are both "0's" and the input signals to the NAND gate 108 are both "1's." This provides "0" and "1" input signals to the NOR gate 103, a "0" signal to the inverter 104 and a "1" to start the pre-set counter 101 counting. After one of the switches 107 or 113 has been set by the initiate signal applied to terminal 102, each succeeding positive or negative pulse from the counter 52 will be passed by either the NAND gate 108 or the NAND gate 114, depending upon which of the switches 107 or 113 was enabled, and will cause the pre-set counter 101 to be advanced one count for each pulse received.

The pre-set counter 101 has two output leads, designated 117 and 118. The lead 117 is connected to the input of the inverter 120, whose output is connected as one input to a NAND gate 121, the other input to which is provided on the lead 118. The output of the AND gate 121 is connected as one input to NAND gate 122, whose other input is from an ON/OFF switch 123. The output of the NAND gate 122 is applied to the NAND gates 91 and 92 in the address counter and logic unit 56 previously described.

The pre-set counter 101 is reset by means of a switch 124, which grounds the counter, and the signals on the lines 117 and 118 will be respectively "1" and "0." In that case, the output signal from the inverter 120 will be a "0." The output from the gate 121 will be a "1," which is inverted by the gate 122 to supply a "0" signal to the gates 91 and 92 in the address counter and logic unit 56. Of course, if the switch 123 is closed, regardless of what is supplied on lines 117 and 118, a "1" signal will be supplied from the gate 122 to the address counter and logic unit 56.

The pre-set counter 101 will remain in that condition providing "1" and "0" signals on the lines 117 and 118, respectively, until one of the switches 107 or 113 is opened and 1000 p.p.s. pulses are delivered to the input of the counter 101 through the gates 103 and 104. After the number of pulses is received by the counter 101 that corresponds to the number to which it was pre-set, the output signals on the lines 117 and 118 reverse, thus providing a "0" signal on line 117, and a "1" signal on line 118. In that situation, the inverter 120 inverts the "0" signal to provide a "1" signal to the gate 121 which is also supplied with a "1" signal from the line 118. Thus the output of the gate 121 is a "0" signal which is inverted by the gate 122 to provide a "1" signal and enable the address counter. At the end of the predetermined time period during which it is desired to load data into one of the memories, the pre-set counter 101 again causes the signals on the lines 117 and 118 to reverse, thus again providing a "1" signal on line 117 and a "0" signal on line 118. As in the first example considered, these signals cause a "0" output signal from the gate 122, which closes the load lines to the circulating memories and resets the address counter.

To recapitulate briefly, the pre-set counter and logic unit 54 is used in the system to feed analog data into the analog-to-digital converter during a predetermined, selected time period after an initiate signal has been received. In the present case, the circulating memories are 2000 microseconds long and hence will hold 250, 8-bit words at a clock rate of one megacycle. If it is desired to sample data once every two milliseconds of real time, that is, provide one digital word every 2 milliseconds, a maximum of 0.5 seconds of analog data can be accommodated in a delay line during any one operation. The pre-set counter and logic unit 54 are used to load analog data from the analog digital converter 13 into the memory loading logic 14, starting at a given time (±½ millisecond) after receipt of an initiate signal, count exactly 0.5 second (±½ millisecond) and then close the logic to the passage of further data.

FIG. 9 illustrates in logic diagram form the memory loading logic unit 14 shown in block form in FIG. 3. As previously noted, one microsecond pulses are supplied from the clock pulse generator 50 to the 8-count ring counter 51. The ring counter 51 comprises eight flipflops, each of which may produce a "1" or a "0" signal. The counter 51 is so designed that only one flipflop is in a "1" condition at any time during the 8-count cycle. Each succeeding flipflop is set to the "1" condition as the preceding flipflop is set to the "0" condition. Thus, each flipflop will be set to the "1" condition once every eight microseconds. These eight consecutive pulses are used to gate the output of the A/D converter 13 so that its parallel output signals are changed into series form for entry into the circulating memories. The output signals from the ring counter 51 are provided on eight output leads 130, and each of the eight consecutive pulses appearing on those lines determines the time that each bit of a word is started into the circulating memories. The pulse that gates the most significant word bit (sign bit) through the line-loading logic is used as "zero time reference" for the word and for the "command encode" signal provided once every 2000 microseconds to the analog-to-digital converter 13. It is also supplied to the counters 52 and 53 in the timing and address unit 18 and to the multiplier 23.

Each of the lines 130 is connected to the input of a different one of eight NAND gates 131. A second input of each of the NAND gates 131 is connected to a different one of the poles of switch sections 31*a*–31*n* of input switch 31. The outputs of the NAND gates 131 are connected to the inputs of a NOR gate 133. The NAND gates 131 and the NOR gate 133 form the scanning input gate 32 shown in block form in FIG. 2. The output from the NOR gate 133 serves as one input to each of three AND gates 33, 34 and 35. The AND gates 33, 34 and 35 are the load gates shown in FIG. 2 that serve respectively to load series of digital numbers into the circulating memories 15, 16 and 17.

Loading of data into the circulating memory 15 is controlled by the output of a NAND gate 134 which is connected through an inverter 135 to a second input of the AND gate 33. Similarly, loading of the circulating memory 16 is controlled by the output of a NAND gate 136 which is connected through an inverter 137 to a second input of the load gate 34. Loading of the circulating memory 17 is controlled by the output of a NAND gate 138 connected to a second input of the load gate 35 through an inverter 139.

Whether or not the outputs of the gates 134, 136 and 138 permit data to be loaded into the circulating memories 15, 16 and 17, respectively, depends upon a number of conditions. Each of the gates 134, 136 and 138 has three inputs. Each gate has an input from switch section 31*i* which provides the "data available" signal from one of the various input devices. Each of the three gates also has an input from the output of the comparator 57 through an inverter 140 which indicates when a count in the divide-by-250 counter 53 and the count in the address counter 90, are identical and, therefore, that it is the proper time to load data into one of the memories. The gate 134 has a third input from a section 141*a* of a two-section gauged load memory switch, which, when closed, provides a "1" signal on the input to the gate 134. The other section 141*b* of the switch grounds one input to the gate 134 when the first section 141*a* is open. Similarly, one input to the gate 136 is from a section 142*a* of a two-section gauged load memory switch, which, when closed, provides a "1" signal on the input to the gate 136. A second section 142*b* of the switch grounds one input to the gate 136 when the switch section 142*a* is open. When all of the input signals to the gate 134 are "1's," the gate will provide a "0" output signal, which will be inverted by the inverter 135 to provide a "1" to the input of load gate 33. Similarly, when all of the input signals to the gate 136 are "1's," the gate output signal will be a "0" which, when inverted by the inverter 137, will provide a "1" to the input of the load gate 34. The third input to the gate 138 for memory 17 is from a section 143*a* of a two-section gauged load memory switch. A second section 143*b* of the switch grounds one input to the gate 138 when the switch section 143*a* is open. When all three inputs to the gate 138 have "1" signals thereon, a "1" signal is provided from the output of the inverter 139 to enable the load gate 35.

The memories 15, 16 and 17 are also respectively provided with hold gates 36, 37 and 38 in the form of AND gates. The outputs of the load gate 33 and hold gate 36 are connected to the inputs of an OR gate 41, whose output is connected to the input of the memory 15; the outputs of the load gate 34 and the hold gate 37 are similarly connected to the input of an OR gate 42 whose output is connected to the input of the memory 16; and the outputs of the load gate 35 and the hold gate 38 are connected as inputs to an OR gate 43 whose output is connected to the input of the memory 17. Inputs to the OR gates 41, 42 and 43 are also respectively connected to ground through switches 15*a*, 16*a* and 17*a*, so that when any one of the switches is closed, the memory with which it is associated is caused to clear itself.

The hold gates 36, 37 and 38 are so arranged with respect to their companion load gates 33, 34 and 35 that when one of each pair of gates is open, the other must be closed. One input to the hold gate 36 is from the output of the NAND gate 134, so that when the output of the gate 134 is a "1," thus opening the hold gate 36, the output of the inverter 137 is a "0," thus closing the load gate 33. Similarly, one input to the hold gate 37 is from the NAND gate 136, and one input to the hold gate 38 is from the output of the NAND gate 138. Thus, either the load gate 34 or the hold gate 37 may be open while the other is closed, and either the load gate 35 or the hold gate 38 may be open while the other is closed.

The second input to the hold gate 36 is from the output of the shift register 20 (FIG. 3), whose input is from the output of the circulating memory 15. If the hold gate 36 is open and the load gate 33 is closed, the series of digital numbers stored in the memory 15 and the shift register 20 will be continuously circulated, unless, of course, the clear memory switch 15*a* is closed. It is pointed out that the memory 15 with shift register 20 in series provides storage for 250, 8-bit digital words.

The hold gate 37 is provided with two additional inputs, one of which is connected to the output of the shift register 21 whose input is connected to the output of the memory 16. The third input to the gate 37 is connected to one contact of a section 145*a* of a single pole, double-throw, "circulate-precess" 145, whose pole is connected to provide a "1" signal on either of the two contacts. In order for the hold gate 37 to be open, the switch section 145*a* must be in the position shown in FIG. 9 to provide a "1" signal to the gate 37. It is again pointed out that the memory 16 in combination with the shift register 21 provides storage for 250, 8-bit digital words. The circulating memory 16 itself provides storage for 249 such words, and the shift register 21 provides storage for one additional word.

The memory loading logic for the circulating memory 16 contains one additional AND gate 40, which serves as a "precess" gate. The precess gate 40 has three inputs, one of which is connected to the output of the NAND gate 136, another of which is connected to a second contact on the switch section 145*a*, and the third of which is connected to the output of the circulating memory 16. A second section 145*b* grounds the input of the gate 37 or 40 that is not to be opened. Thus, if the precess gate 40 is open, which means that the hold gate 37 will be closed (because of the position of switch 145), 1992 microseconds of stored digital numbers (249 words) will be continuously circulated through memory 16. This is in comparison to 2000 microseconds of stored digital numbers (250 numbers) that are continuously circulated through memory 15. Thus, the words stored in the memory 16 precess one word with respect to the words stored in the memory 15 during each circulation cycle. In the event that new data is to be entered into the memory 16, the oldest word (that is, the word in the shift register 21) is erased by operation of the memory loading logic 14. In the event that the loading logic of memory 16 is arranged for the data in memory 16 to precess with respect to the data in memory 15, the data in the 8-bit shift register 21, which is connected to the output of the circulating memory 16, is not lost before it is transferred to the multiplier and digital-to-analog converter 23 (FIGS. 2 and 3). Thus, the data circulating in the memory 16 will precess one word for each circulation cycle with respect to the data stored in the memory 15, and a new 8-bit word can be entered into the circulating memory 16 each time the data circulates.

Each of the 8-bit shift registers 20, 21 and 22 is of conventional design and produces a signal F and its complement $\overline{F}$ for each of the 8-bits stored therein. Such registers are well-known in the art and may be designed in accordance with the principles set forth in chapter 5 of the aforementioned book by R. K. Richards, entitled "Arithmetic Operations in Digital Computers." The output signals from the shift registers 20 and 21 are provided to the multiplier and digital-to-analog converter 23, shown in general block form in FIGS. 2 and 3 and in more detailed block form in FIG. 10. The multiplier and digital-to-analog converter 23 is fully described in patent application Ser. No. 470,978 filed July 12, 1965 and hence will be treated only briefly here.

The output signals F and $\overline{F}$ from the shift registers 20 and 21 are respectively supplied to binary storage registers 150 and 151 which store the signals while they are being multiplied together. The storage registers 150 and 151 are conventional in design and may comprise a number of flip-flops equal to the number of bits in the signals received. Such registers are well known in the art, one being described in a book entitled "Digital Computer Principles" by Burroughs Corporation, published by McGraw-Hill Book Company, 1962, Library of Congress Catalog No. TE 7888.3.B85.

The two bits representing the algebraic signs of the two numbers stored in registers 150 and 151 are supplied to a sign computer 152, which serves to provide an output signal indicative of whether the signs of the two signs are alike or different. The output signal from the sign computer is provided to sign logic circuitry 153 along with signals representing the number stored in the register 151.

The sign logic circuitry 153, in response to a signal from the sign computer 152 indicating that the algebraic signs of the numbers stored in the registers 150 and 151 are different, causes the numbers stored in the register 151 to be complemented, for a reason which is explained in detail in the aforementioned application Ser. No. 470,978.

By complement as used herein, is meant the second binary number that must be added to a first binary number to give the largest possible binary number containing the same number of digits. This is known as the "1's" complement. For example, in binary form, the "1's" complement of "1101001," for example, is "0010110."

This is consistent with the definition found on p. 406 of a book by Flores entitled "Computer Logic," Prentice-Hall, Inc., 1960, Library of Congress Card No. 60–16719.

The output signals from the sign logic circuitry 153, representing either the number stored in the register 151 or its complement, are provided to a multiplying matrix 154 along with signals representing the number stored in the register 150. The multiplying matrix 154 multiplies together the two sets of binary signals supplied thereto and supplies an output signal proportional to their product and having a polarity determined by whether the signals multiplied together have the same algebraic signs or have different algebraic signs. The output signals from various channels in the multiplying matrix 154 are supplied to a summing network 155, which properly weights the signals in accordance with the significance of the digits represented by the signals. By "significance" is meant the position of the digit in the product number.

Since the signals stored in the registers 150 and 151 are not continuously variable, but change from one value to another at discrete time intervals (once every eight microseconds), as determined by signals from the ring counter 51, the output of the summing network 155 is in the form of a stepped signal. To produce a smooth continuously variable output signal, the output of the summing network 155 is supplied to an integrator 24 (FIGS. 2 and 3) of conventional design. The output of the integrator is then connected to energize a utilization device 29, which may be a recorder, a cathode ray tube, a computer, or other desired indicating or utilization device.

Signals from the shift register 20 are provided to a plurality of input terminals 156 for the storage register 150. Similarly, signals are supplied from the shift register 21 to input terminals 157 for storage register 151. It is pointed out that, in this particular application, a signal and its complement are supplied to the registers 150 and 151 for each binary bit stored in the shift registers 20 and 21. In other applications, the complementary bits could be generated in the storage registers themselves.

The first sign signal and its complement stored in the register 150 are continuously supplied to the sign computer 152 on leads 158, and the second sign signal and its complement stored in register 151 are similarly supplied on leads 160. The sign computer 152 serves to compare the signals supplied thereto and to provide a third sign signal and its complement on leads 161 to the sign logic circuitry 153. The binary signals and their complements representing the numbers stored in register 151 are also continuously supplied to the sign logic circuitry 153 on leads 162.

The sign logic circuitry 153, in response to the signals received from the sign computer 152, provides on output leads 164 binary signals representing either the binary number stored in the register 151 or else its complement. If the algebraic signs of the numbers stored in the registers 150 and 151 are the same, signals representing the numbers stored in register 151 are provided on the output leads 164 from the sign logic circuitry. On the other hand, if the signs of the numbers stored in registers 150 and 151 are different, signals representing the complement of the number stored in the register 151 are provided on the leads 164 from the sign logic circuitry. The signals on the leads 164 are continuously supplied to the multiplying matrix 154. Binary signals representing the numbers stored in the register 150 and their complements are also continuously supplied to the multiplying matrix 154 on leads 165, simultaneously with the signals from the sign logic circuitry on leads 164 from the sign logic circuitry 153. The third sign signal is also supplied to the matrix 154 on lead 166.

As indicated in FIG. 9, the numbers stored in registers 150 and 151 consist of seven bits and a sign bit, the sign bit being the most significant bit of each stored number.

Because the number stored in the register 150 consists of seven bits, the multiplying network 154 comprises seven separate gating channels 170, 171, 172, 173, 174, 175, 176, of gating circuits, each channel of which receives a different bit and its complement from the register 150. The signals from the ouputs of the sign logic circuitry 153 are supplied to all seven of the channels in the multiplying matrix on the leads 164, and a signal from the sign computer 152 is similarly supplied to all seven channels on a lead 166. Each of the channels 170–176 comprises eight gating circuits. Thus, it is seen that at any one time channel 170 serves to multiply the number supplied thereto on the leads 164 by the least significant digit of the number supplied thereto from the storage register 150. Similarly, at that same time, channel 171 serves to multiply the number supplied from the sign logic circuitry 153 by the next to the least significant digit of the number stored in the register 150, and so on until channel 176 multiplies the number from the sign logic circuitry by the most significant digit (except for the sign digit) of the number stored in register 150. Thus the output of channel 170 represents the digit corresponding to $2^0$ or one, the output of channel 171 represents the digit corresponding to $2^1$ or two, the output of channel 172 represents the digit corresponding to $2^2$ or four, the output of channel 173 represents the digit corresponding to $2^3$ or eight, the ouput of channel 174 represents the digit corresponding to $2^4$ or sixteen, the output of channel 175 represents the digit corresponding to $2^5$ or thirty-two, and the output of channel 176 represents the digit corresponding to $2^6$ or sixty-four.

The output signals of the multiplying channels 170–176 are supplied to the summing network 155. The summing network 155 adds together all of the signals received from the multiplying matrix 154 and weights them in accordance with the significance of the digits that they represent. Thus, the output from the multiplier channel 170 might be assigned a weight of one unit to correspond to the least significant bit in the $2^0$ position; channel 171, a weight of two units to correspond to the second least significant bit in the $2^1$ position; channel 172, a weight of four units to correspond to the third significant bit in the $2^2$ position; channel 173, a weight of eight units to correspond to the fourth least significant bit in the $2^3$ position; channel 174, a weight of 16 units to correspond to the fifth least significant bit in the $2^4$ position; channel 175, a weight of 32 units to correspond to the sixth least significant bit in the $2^5$ position; and channel 176, a weight of 64 units to correspond to the most significant bit (seventh) in the $2^6$ position. The summed output signals are provided on an output terminal 177 from the summing network 155.

Summarizing briefly, the multiplier and digital-to-analog converter 23 receives two digital signals representing two numbers to be multiplied together, each of which includes a signal representing the algebraic sign of the number. The two numerical signals and their respective sign signals are respectively stored in two storage registers. The sign signals are supplied to a sign computer, which determines the identity or non-identity of the two algebraic signs. The numerical signals from one of the storage registers are supplied to sign logic circuitry along with signals from the sign computer indicating the identity or non-identity of the two signs. If the two algebraic signs are different, the sign logic circuitry provides at its output the complement of the numerical signal supplied to it; if the algebraic signs are the same, the output of the sign logic circuitry represents the numerical signal supplied to the circuitry.

The numerical signals from that register which are not supplied to the sign logic circuitry are supplied to a multiplying matrix, which simultaneously multiplies together the two sets of signals and also weighs the output signals in accordance with the significance of the various digits in the numbers. If the algebraic signs of the two numbers being multiplied together are the same, the output of the matrix is positive in polarity; if the signs are different, the output is negative.

The output signals from the multiplying matrix are summed in a summing network to provide an analog output signal which is proportional in amplitude to the product of the two digital input signals and whose polarity indicates the identity or non-identity of the algebraic signs of the digital numbers. Since the digital input numbers change periodically rather than continuously, an integrator 24 or other suitable means may be utilized to produce a smooth continuously variable output signal to energize an indicator.

FIG. 11 is a diagram of the memory loading logic, similar to FIG. 9, of a second embodiment of the computer of the invention. The memory loading logic differs from that shown in FIG. 9 primarily in the logic involved in loading the memory 15. The logic for the memories 16 and 17 is identical to that described with reference to FIG. 9 and like reference numerals have been used on like components.

The embodiment of the invention whose logic is shown in FIG. 11 differs from that previously described in that means are provided for causing the series of numbers stored in the memory 15 to advance one number each time the series circulates (that is to precess) or to circulate continuously as in the embodiment previously described. Of course, the series of numbers stored in the memory 16 may circulate continuously or precess if desired, as in the embodiment described with reference to FIG. 9. As shown in FIG. 11, the OR gate 41′, whose output is connected to the input of the memory 15, has four inputs, rather than three as in the case of the OR gate 41 shown in FIG. 9. One of the inputs to the OR gate 41′ is from the memory clear switch **15*a*, another is from the load gate 33, and another is from a hold gate 36′. The fourth input to the OR gate 41′ is from a precess gate 200. The functions of the AND gates 33, 36′ and 200** will be hereinafter explained in more detail.

One of the principal advantages of the embodiment shown in FIG. 11 is that it permits data from two different analog input sources to be simultaneously loaded into the memories 15 and 16. In order to accomplish this function, a separate scanning input gate 32′ is provided. The scanning input gate 32′ comprises eight NAND gates 131′, each of which has two inputs. One input of each of the NAND gates 131′ is connected in parallel with a corresponding input of one of the NAND gates 131 to different ones of the eight flipflops comprising the eight-count ring counter 51. The other inputs of the NAND gates 131′ are connected respectively to eight output leads of the A/D converter 13′, similar to the A/D converter 13 previously described. Input to the A/D converter 13′ is from an analog input source 10 which may be similar to the analog input source 10 previously described. The A/D converter 13′ also receives a "command encode" signal from the counter 53 in the timing and address unit 18. A ninth output lead from the A/D converter 13′ which carries a "data available" signal, is connected to the timing and address unit 18 and to memory loading logic gates 134, 136 and 138 (FIG. 9).

The outputs of the eight NAND gates 131′ are connected to the inputs of a NOR gate 133′. The scanning input gate 32′ operates in a manner similar to that of the scanning input gate 32 previously described. It functions to convert the 8-bit binary signals supplied to the NAND gates 131′ from the A/D converter 13′ into series form for entry into the memory 15.

As previously mentioned, one of the inputs to the OR gate 41′ that feeds data into the memory 15 is from the load gate 33. In the embodiment shown in FIG. 11, the logic is so arranged that the load gate 33 can receive input data from either the scanning gate 32′ or the scanning gate 32. One input to the AND gate 33 is from NAND gate 134, which functions as previously described with reference to FIG. 9 to permit the data to pass through the gate 33 only at the proper time to load the memory 15. A second input to the load gate 33 is from either an AND gate 202 or from an AND gate 203, whose outputs are connected together and to the second input of the load gate 33.

One input to the AND gate 202 is from the output of the NOR gate 133′, and one input to the AND gate 203 is from the output of the NOR gate 133. Thus, if the gate 202 is open, data from the analog input source 10′ can be loaded into the memory 15. Similarly, if the gate 203 is opened, data from the analog input source 10 (FIG. 2) can be loaded into the memory 15. Opening and closing of the gates 202 and 203 is controlled by a single-pole, double-throw switch section **204*a*, which provides a "1" signal either to gate 202 or to gate 203. A second section 204*b*** of the switch connects the input of the closed gate to ground when the other gate is open.

The hold gate 36′, whose output is connected as an input to the OR gate 41′, has three inputs. One input is from the gate 134, which serves to close the gate 36′ when the load gate 33 is open. Another input to the gate 36′ is from the output of shift register 20. A third input to the gate 36′ is from one contact of a single-pole, double-throw switch section **205*a*, which serves to supply a "1" signal to the gate 36′ when the pole of the switch section is in the position shown. The other contact of the switch section 205*a* is connected as an input to the precess gate 200, so that the switch serves as a "circulate-precess" switch. A second section 205*b* of the switch serves to ground the input to whichever of the gates 200 or 36′ is not receiving a "1" signal from the section 205*a***.

As previously mentioned, the precess gate 200 has an input from the switch section **205*a*. It also has an input connected to receive a signal from the gate 134 to maintain the gate 200 closed when the load gate 33 is open. A third input to the gate 200 is from the output of the circulating memory 15**.

As is now apparent, the memory loading logic that serves the circulating memory 15 operates in much the same manner as that which serves the circulating memory 16. More specifically, the series of numbers stored in the memory 15 may be caused to precess one number for each circulation cycle of the series of stored numbers, as can the series stored in the memory 16. Thus, it is possible to load simultaneously the memories 15 and 16 from two separate analog input sources and every 0.2 millisecond obtain an analog output signal representing a point (correlation coefficient) of the correlation function between the signals stored in the two circulating memories. Each time that each of the series of numbers circulates, that is, every 0.2 millisecond, one number of each of the series may be erased and new numbers inserted into each of the series. The new numbers respectively inserted into the two memories are inserted simultaneously from the load gate 33 and the load gate 34.

In effect, successive overlapping subgroups of successive numbers from each of the original series of numbers are circulated in each of the circulating memories. While corresponding subgroups in the respective series of numbers are being circulated simultaneously in the pair of memories 15 and 16, the simultaneously circulating subgroups are cross-correlated, thus generating a cross-correlation coefficient between this pair of corresponding subgroups. As successive subgroups are circulated, they are similarly cross correlated, thus generating a succession of correlation coefficients. The successive subgroups from each series of numbers overlap, since only one number of each subgroup is replaced during each circulation through the corresponding memory. The end result is a succession of signals that indicate how the cross-correlation coefficient varies as a function of time between successive pairs of subgroups that occur simultaneously in the two series of numbers. While in a running cross-correlation technique the subgroup from one of the series of numbers is fixed while the other precesses, in this technique the subgroups from both series of numbers precess. Since the two series of numbers do not move relative to each other in time, a measure is obtained of the cross-correlation between successive simultaneously occurring portions of the two series of numbers.

Of course, if the gate 203 is open, the memory 15 receives data and operates in the manner described with reference to FIG. 9.

As is now apparent, NAND and NOR gates are primarily used in the computer of the invention, rather than AND and OR gates. As previously noted, a NAND gate ordinarily comprises an AND gate followed by an inverter, and a NOR gate ordinarily comprises an OR gate followed by an inverter. The inverters serve not only to invert but also to provide an output signal having the same signal amplitude level as the input signals, assuming that this is desired, or at another desired signal level. Conversely, the output signals of conventional AND and OR gates generally have signal amplitude levels that are lower than those of the input signals. Therefore, the use of NAND and NOR gates is preferred in the best embodiment of the invention, although, of course, the invention is not limited to their use.

SUMMARY

Summarizing briefly, and referring primarily to FIGS. 2, 3 and 4, a correlation computer embodying the invention provides a highly versatile, accurate, digital device. Input signals to the computer may be in analog form from an analog input source 10, or in digital form from a manual input source 11 or from a stored input source 12. Signals from the analog input source 10 are converted to digital signals by an analog-to-digital converter 13.

Three circulating digital memories 15, 16 and 17 are provided for storing three series of digital numbers, the series of digital numbers being loaded into the memories 15, 16 and 17 under the control of the memory loading logic unit 14. The memory loading logic unit 14, in turn, is controlled by output signals from the timing and address unit 18. The memory 15 is provided at its output with a shift register 20, the memory 16 is similarly provided with a shift register 21, and the memory 17 is provided with a shift register 22 at its output. The series of digital numbers stored in the memory 15 and in the shift register 20 can be continuously re-circulated through that memory and shift register, or only the series of numbers stored in the memory 15 can be re-circulated through the memory. Similarly, the series of numbers stored in memory 16 and the shift register 21 can be continuously re-circulated through that memory and shift register, or only the series of numbers stored in the memory 16 can be re-circulated through the memory. If the series of numbers stored in one memory and shift register is re-circulated and the series of numbers stored in another memory (and not shift register) is re-circulated, the series of numbers stored in one register will precess by one number for each circulation cycle relative to the series of numbers stored in the memory and shift register.

Output signals from the shift register 20 and the shift register 21 are supplied every 8 microseconds to the multiplier and digital-to-analog converter 23 which continuously multiplies together the signals supplied thereto and provides an analog output signal from the analog output unit 24.

The output signals from the shift register 22, whose input is from the output of the memory 17, may be supplied to a digital-to-analog converter 25 and thence to an analog output unit 27, or to the punch logic unit 26 and a paper tape or card punch 28. The memory 17 serves as an auxiliary memory which, in one instance, may provide a permanent record output of the series of numbers stored in the memory 15. Alternatively, the output of the integrator 24 may be fed back to the input of the analog-to-digital converter 13, the digital output of the converter 13 stored in the memory 17, and a permanent record made in digital form of the correlation signal output of the analog output unit 24 by means of the punch logic 26 and paper tape or card punch 28.

Loading of the series of digital numbers into the various memories is controlled by the memory loading logic unit 14. The memory loading logic unit 14 comprises, in one embodiment, a load gate 33 and a hold gate 36 whose outputs are connected through an OR gate 41 to the input of the memory 15 (FIG. 3). Connected to the input of the memory 16 through an OR gate 42 are a load gate 34, a hold gate 37, and a precess gate 40. A load gate 35 and a hold gate 38 are connected through an OR gate 43 to the input of the memory 17. The various gates for each of the memories are so controlled by the timing and address unit 18 that only one gate for each of the memories can be open at one time. If a load gate is open while its companion hold gate is closed, data can be loaded into the particular memory that it feeds. Conversely, if a hold gate is open while a companion load gate is closed, data is circulated in the corresponding memory. If, in the case of the memory 16, the precess gate 40 is open and the load gate 34 and the hold gate 37 are closed, the series of numbers stored in the memory 16 precesses, that is, advances, one number for each circulation cycle with respect to the series of numbers stored in the memory 15 and shift register 20.

The timing and address unit 18 shown in FIG. 4, as previously mentioned, provides the timing for the entire computer. The timing and address unit 18 comprises a clock pulse generator 50 which provides 1 megacycle pulses in order to clock data into the shift registers, memories, and the memory loading logic unit, and into an eight-count ring counter 51. The ring counter 51 provides 1 megacycle per second pulses to the memory loading logic 14 to convert data presented to the logic in parallel form into series form for loading into the memories. It also provides 125 k.c./s. pulses to the multiplier and analog-to-digital converter 23 to change the number supplied thereto every 8 microseconds, and provides similar pulses to a divide-by-125 counter 52 and a divide-by-250 counter 53. The 1000 c.p.s. output signals of the counter 52 are provided to the pre-set counter logic 54 and the 500 c.p.s. output signals of the counter 53 are provided to the analog-to-digital converter 13 as "command encode" signals. The 500 c.p.s. output signals of the counter 53 are also supplied to the logic unit 55, which receives signals from the address counter logic unit 56 and provides an output through the comparator 57 to the memory loading logic unit 14 at the proper time to enter digital numbers into the memories.

It is again pointed out that time compression in the ratio of 250:1 takes place as data is entered into one of the memories from the analog-to-digital converter 13. This occurs, under control of the timing and address unit 18, because a sample of analog input data is taken every 8 microseconds from the analog input source 10. It is assumed, of course, that the analog output signals from the source 10 are continuously varying in time. The invention, of course, is not limited to any particular basic clock pulse frequency, and hence is not limited to any particular sampling rate of continuously varying analog input data.

Although the best embodiments of the invention have been shown and described, it will be understood that many variation therein may be made by one skilled in the art without departing from the true spirit of the invention.

The invention claimed is:

1. A digital correlation device for correlating two series of digital numbers, each digital number containing a digit representing the algebraic sign of the number, the correlation device comprising:

two circulating digital memories for respectively storing said two series of digital numbers, each of said memories having an input connected to receive a respective one of said series and having an output;

precessing means selectively operable with one of said circulating memories for causing the series of numbers stored therein to be progressively displaced in time with respect to the series of numbers stored in the other of said circulating memories; and multiplying means connected to said outputs of said circulating memories for multiplying together corresponding successive digital numbers respectively stored in said two circulating memories and providing analog output signals whose amplitudes are proportional to the products of said successive digital numbers, said multiplying means including means for providing said analog output signals with one polarity when the algebraic signs of said two numbers being multiplied together are the same and with opposite polarity when the algebraic signs of said two numbers are different.

2. The correlation device defined by claim 1, wherein each said circulating memory comprises a delay line and a shift register connected in a loop.

3. The correlation device defined by claim 2, wherein said precessing means associated with said one of said circulating memories comprises means for shunting the shift register connected in series with the delay line in said one of said circulating memories, whereby the series of numbers stored in said one of said circulating memories circulates at a faster rate than the series of numbers stored in said other of said circulating memories.

4. The correlation device defined by claim 3, further including integrating means for integrating said analog output signals from said multiplying means.

5. A digital correlation device for correlating two series of digital numbers, each digital number containing a digit representing the algebraic sign of the number, the correlation device comprising:

analog-to-digital input means for sampling an analog input signal and producing at its output at least one series of digital numbers representing the amplitudes and algebraic signs of the samples of said analog signal;

manual input means for producing at its output at least one series of digital numbers, each number having a digit representing the algebraic sign of the number;

two circulating digital memories for respectively storing said two series of digital numbers, each memory having an input and an output;

switching means for selectively connecting the outputs of said analog-to-digital input means and said manual input means to the inputs of said circulating memories;

precessing means selectively operable with one of said circulating memories for causing the series of numbers stored therein to be variably displaced in time with respect to the series of numbers stored in the other of said memories; and multiplying means connected to said outputs of said circulating memories for multiplying together successive digital numbers respectively stored in said two circulating memories and providing analog output signals whose amplitudes are proportional to the products of said successive digital numbers, said multiplying means including means for providing said analog output signals with one polarity when the algebraic signs of said two numbers being multiplied together are the same and with opposite polarity when the algebraic signs of said two numbers are different.

6. The correlation device defined by claim 5, wherein each said circulating memory comprises a delay line and a shift register connected in a loop.

7. The correlation device defined by claim 6, wherein said precessing means associated with said one of said circulating memories comprises means for shunting the shift register connected in series with the delay line in said one of said circulating memories, whereby the series of numbers stored in said one of said circulating memories circulates at a faster rate than the series of numbers stored in said other of said circulating memories.

8. The correlation device defined by claim 7, further including integrating means for integrating said analog output signals from said multiplying means.

9. The correlation device defined by claim 5, including means for compressing said series of digital numbers in time when said series are stored in said circulating memories.

10. A digital correlation device for correlating two series of digital numbers, each digital number containing a digit representing the algebraic sign of the number, the correlation device comprising:

analog-to-digital input means for sampling an analog input signal and producing at its output at least one series of digital numbers representing the amplitudes and algebraic signs of the samples of said analog signal;

manual input means for producing at its output at least one series of digital numbers, each having a digit representing the algebraic sign of the number;

automatic input means having an input and an output for producing at its output at least one series of digital numbers corresponding to at least one series of pre-recorded digital numbers supplied to its input;

two circulating digital memories for respectively storing two series of digital numbers, each memory having an input and an output;

switching means for selectively connecting the outputs of said analog-to-digital input means, said manual input means and said automatic input means to the inputs of said circulating memories;

precessing means selectively operable with one of said circulating memories for causing the series of numbers stored therein to be variably displaced in time with respect to the series of numbers stored in the other of said memories; and multiplying means connected to said outputs of said circulating memories for multiplying together successive digital numbers respectively stored in said two circulating memories and providing analog output signals whose amplitudes are proportional to the products of said successive digital numbers, said multiplying means including means for providing said analog output signals with one polarity when the algebraic signs of said two numbers being multiplied together are the same and with opposite polarity when the algebraic signs of said two numbers are different.

11. The correlation device defined by claim 10, wherein each said circulating memory comprises a delay line and a shift register connected in a loop.

12. The correlation device defined by claim 11, wherein said precessing means associated with said one of said circulating memories comprises means for shunting the shift register connected in series with the delay line in said one of said circulating memories, whereby the series of numbers stored in said one of said circulating memories are shifted at a faster rate than the series of numbers stored in said other of said circulating memories.

13. The correlation device defined by claim 12, further including integrating means for integrating said analog output signals from said multiplying means.

14. The correlation device defined by claim 10, including means for compressing said series of digital numbers in time when said series are stored in said circulating memories.

15. In a digital correlation device for correlating two series of digital numbers and having two circulating digital memories for respectively storing said two series of digital numbers, each memory having an input and an output, multiplying means connected to said outputs of said circulating memories for multiplying together successive digital numbers respectively stored in said two circulating memories and providing analog output signals whose amplitudes are proportional to the products of said successive digital numbers, the improvement comprising:

a third circulating memory for storing such a series of digital numbers and having an input and an output;

switching means connected to said input of said third circulating memory for selectively storing one of said two series of digital numbers therein; and means connected to said output of said third circulating memory for displaying the series of digital numbers stored in said third memory.

16. In a digital correlation device for correlating two series of digital numbers and having two circulating digital memories for respectively storing said two series of digital numbers, each memory having an input and an output, multiplying means connected to said outputs of said circulating memories for multiplying together successive digital numbers respectively stored in said two circulating memories and providing analog output signals whose amplitudes are proportional to the products of said succesive digital numbers, the improvement comprising:

an analog-to-digital converter having an input and an output;

a third circulating memory for storing digital numbers and having an input and an output ;

first switching means connected to supply said analog output signals to said input of said analog-to-digital converter;

second switching means for connecting said output of said analog-to-digital converter to said input of said third circulating memory for storing digital numbers therein; and means conneced to said output of said third circulating memory for displaying the digital numbers stored in said third memory.

17. In a digital correlation device for correlating two series of digital numbers and having analog-to-digital input means for sampling an analog input signal and producing at its output at least one series of digital numbers representing the amplitudes and algebraic signs of the samples of said analog signal, two circulating digital memories for respectively storing two series of digital numbers, each memory having an input and an output, precessing means selectively operable with one of said circulating memories for causing the series of numbers stored therein to be variably displaced in time with respect to the series of numbers stored in the other of said memories, and multiplying means connected to said outputs of said circulating memories for multiplying together successive digital numbers respectively stored in said two circulating memories and providing analog output signals whose amplitudes are proportional to the products of said successive digital numbers, the improvement comprising:

a third circulating memory for storing a series of such digital numbers and having an input and an output;

switching means connected to said input of said third circulating memory for selecting a series of digital numbers to be stored therein; and means connected to said output of said third circulating memory for displaying the series of digital numbers stored in said third memory.

18. In a digital correlation device for correlating two series of digital numbers and having analog-to-digital input means for sampling an analog input signal and producing at its output at least one series of digital numbers representing the amplitudes and algebraic signs of the samples of said analog signal, two circulating digital memories for respectively storing two series of digital numbers, each memory having an input and an output, precessing means selectively operable with one of said circulating memories for causing the series of numbers stored therein to be variably displaced in time with respect to the series of numbers stored in the other of said memories, and multiplying means connected to said outputs of said circulating memories for multiplying together successive digital numbers respectively stored in said two circulating memories and providing analog output signals whose amplitudes are proportional to the products of said successive digital numbers, the improvement comprising:

a third circulating memory for storing such digital numbers and having an input and an output;

first switching means connected to supply said analog output signals to said input of said analog-to-digital input means;

second switching means for connecting said output of said analog-to-digital converter to said input of said third circulating memory for storing digital numbers therein; and means connected to said output of said third circulating memory for displaying the series of digital numbers stored in said third memory.

19. A digital correlation device for correlating two series of digital numbers, each digital number containing a digit representing the algebraic sign of the number, the correlation device comprising:

two circulating digital memories for respectively storing said two series of digital numbers, each of said memories having an input connected to receive a respective one of said series and having an output;

means selectively operable with at least one of said circulating memories for causing at least one number of the series of numbers stored therein to be erased each circulation cycle and at least one new number added to said series of numbers stored therein; and multiplying means connected to said outputs of said circulating memories for multiplying together corresponding successive digital numbers respectively stored in said two circulating memories and providing analog output signals whose amplitudes are proportional to the products of said successive digital numbers, said multiplying means including means for providing said analog output signals with one polarity when the algebraic signs of said two numbers being multiplied together are the same and with opposite polarity when the algebraic signs of said two numbers are different.

20. The correlation device defined by claim 19, wherein each said circulating memory comprises a delay line and a shift register connected in series.

21. The correlation device defined by claim 20, wherein said means selectively operable with said at least one of said circulating memories comprises means for shutting the shift register connected in series with the delay line in said at least one of said circulating memories.

22. The correlation device defined by claim 21, further including integrating means for integrating said analog output signals from said multiplying means.

23. In a digital correlation device for correlating two series of digital numbers;

a memory loading logic unit;

means for supplying two such series of digital numbers to said memory loading logic;

two digital memories connected to said memory loading logic for receiving and storing said two series of digital numbers, each memory having an input to which the respective series of digital numbers are supplied by said loading logic;

means connecting the outputs of said memories for circulating the respective series of digital numbers through said memory loading logic to said each memory;

multiplying means connected to said outputs for multiplying together successive digital numbers respectively stored in said two memories and for forming a third series of digital signals representing the products of said pairs of signals in said first two series of signals;

means for feeding to said memory loading logic said third series of digital numbers corresponding to the products of said respective successive digital numbers;

a third memory having an input and an output;

means for circulating a fourth series of digital numbers from the output of said third memory to the input thereof through said memory loading logic;

means connected to said output of said third memory for displaying the series of digital numbers stored in said third memory;

and switching means connected to the input of said third memory for selectively feeding to said third memory one of said three series of digital numbers to form said fourth series of digital numbers.

References Cited

UNITED STATES PATENTS

| | | | |
|---|---|---|---|
| 2,936,116 | 5/1960 | Adamson et al. | 235—165 |
| 3,009,638 | 11/1961 | Merz et al. | 235—152 |
| 3,036,775 | 5/1962 | McDermid et al. | 235—165 |
| 3,248,528 | 4/1966 | Campeau | 235—152 XR |
| 3,311,910 | 3/1967 | Doyle | 235—150.52 |
| 3,303,335 | 2/1967 | Pryor | 235—152 XR |
| 3,327,103 | 6/1967 | Bonnet | 235—181 |
| 3,354,297 | 11/1967 | Anderson et al. | 235—181 |
| 3,376,411 | 4/1968 | Montani et al. | 235—151.32 |
| 3,238,298 | 3/1966 | Willis | 340—172.5 XR |

MARTIN P. HARTMAN, *Primary Examiner.*

U.S. Cl. X.R.

235—152, 165